United States Patent
Yan et al.

(10) Patent No.: US 11,545,886 B2
(45) Date of Patent: Jan. 3, 2023

(54) PULSE WIDTH MODULATION CONTROLLERS FOR HYBRID CONVERTERS

(71) Applicant: Analog Devices, Inc., Wilmington, MA (US)

(72) Inventors: Yingyi Yan, Fremont, CA (US); San Hwa Chee, San Ramon, CA (US)

(73) Assignee: Analog Devices, Inc., Wilmington, MA (US)

(*) Notice: Subject to any disclaimer, the term of this patent is extended or adjusted under 35 U.S.C. 154(b) by 25 days.

(21) Appl. No.: 17/248,289

(22) Filed: Jan. 19, 2021

(65) Prior Publication Data
US 2022/0231618 A1    Jul. 21, 2022

(51) Int. Cl.
| H02M 3/158 | (2006.01) |
| H02M 1/00 | (2006.01) |
| H02M 1/088 | (2006.01) |

(52) U.S. Cl.
CPC ....... H02M 1/0025 (2021.05); H02M 1/0095 (2021.05); H02M 3/1584 (2013.01); *H02M 1/088* (2013.01)

(58) Field of Classification Search
CPC ...... H02M 3/158; H02M 3/1584; H02M 1/08; H02M 1/088; H02M 1/0016; H02M 1/0022; H02M 1/0025
See application file for complete search history.

(56) References Cited

U.S. PATENT DOCUMENTS

| 6,903,536 B2 | 6/2005 | Yang |
| 7,230,405 B2 | 6/2007 | Jang et al. |
| 7,733,072 B2 | 6/2010 | Kanakubo |
| 7,746,041 B2 | 6/2010 | Xu et al. |
| 7,782,027 B2 | 8/2010 | Williams |

(Continued)

FOREIGN PATENT DOCUMENTS

| CN | 108574411 A | 9/2018 |
| CN | 109004832 | 12/2018 |

(Continued)

OTHER PUBLICATIONS

Amin, Sally Safwat, "A Fully Integrated Li-Ion-Compatible Hybrid Four-Level DC-DC Converter in 28-nm FDSOI", IEEE Journal of Solid-State Circuits, 54(3), (Mar. 2019), 720-732.

Lei, Yutian, "An Analytical Method to Evaluate Flying Capacitor Multilevel Converters and Hybrid Switched-Capacitor Converters for Large Voltage Conversion Ratios", IEEE 16th Workshop on Control and Modeling for Power Electronics (COMPEL), (2015), 7 pgs.

(Continued)

*Primary Examiner* — Alex Torres-Rivera
(74) *Attorney, Agent, or Firm* — Schwegman Lundberg & Woessner, P.A.

(57) ABSTRACT

Pulse width modulation (PWM) controllers for hybrid converters are provided herein. In certain embodiments, a PWM controller for a hybrid converter includes a threshold generation circuit for generating a threshold signal based on an output voltage of the hybrid converter, a threshold adjustment circuit for generating an adjusted threshold signal based on sensing a voltage of a flying capacitor of the hybrid converter, and a comparator that generates a comparison signal based on comparing the adjusted threshold signal to an indication of an inductor current of the hybrid converter. The output of the comparator is used for generating PWM control signals used for turning on and off the switches (for instance, power transistors) of the hybrid converter.

20 Claims, 25 Drawing Sheets

(56) References Cited

U.S. PATENT DOCUMENTS

| | | | |
|---|---|---|---|
| 7,952,337 B2 | 5/2011 | Gurcan | |
| 7,969,129 B2 | 6/2011 | Kudo | |
| 8,854,019 B1 | 10/2014 | Levesque et al. | |
| 9,024,600 B2 | 5/2015 | Wiktor et al. | |
| 9,136,756 B2 | 9/2015 | Liu | |
| 9,295,116 B2 | 3/2016 | Sanders et al. | |
| 9,362,832 B2 | 6/2016 | Karlsson et al. | |
| 9,484,799 B2 | 11/2016 | Zhang et al. | |
| 9,600,062 B2 | 3/2017 | Kumar | |
| 9,653,996 B2 | 5/2017 | Parto et al. | |
| 9,793,794 B2 * | 10/2017 | Stauth | H02M 3/07 |
| 9,966,842 B1 | 5/2018 | Jiang et al. | |
| 10,063,147 B2 | 8/2018 | Høyerby | |
| 10,075,073 B2 | 9/2018 | Guan et al. | |
| 10,498,236 B2 | 12/2019 | Liu et al. | |
| 10,505,445 B2 | 12/2019 | Oh | |
| 10,541,623 B1 | 1/2020 | Michal | |
| 10,547,241 B1 | 1/2020 | Li et al. | |
| 10,601,324 B1 | 3/2020 | Kudva et al. | |
| 10,615,697 B1 * | 4/2020 | Ferrari | H02M 7/4837 |
| 10,756,624 B2 | 8/2020 | Mauri | |
| 10,833,661 B1 | 11/2020 | Archibald et al. | |
| 2006/0103364 A1 * | 5/2006 | Adragna | H02M 1/4225 323/282 |
| 2008/0247194 A1 | 10/2008 | Ying et al. | |
| 2014/0346962 A1 | 11/2014 | Sanders et al. | |
| 2015/0062108 A1 * | 3/2015 | Archibald | H02M 3/156 345/212 |
| 2016/0336855 A1 | 11/2016 | Ozanoglu et al. | |
| 2017/0085183 A1 | 3/2017 | Notsch | |
| 2017/0201177 A1 | 7/2017 | Kesarwani et al. | |
| 2018/0294717 A1 | 10/2018 | Zhang et al. | |
| 2019/0348913 A1 | 11/2019 | Zhang et al. | |
| 2020/0091817 A1 | 3/2020 | Teplechuk et al. | |
| 2020/0212795 A1 | 7/2020 | Das et al. | |
| 2020/0259418 A1 * | 8/2020 | Higaki | H02M 3/1584 |
| 2020/0321860 A1 | 10/2020 | Amin et al. | |
| 2021/0083573 A1 * | 3/2021 | Yen | H02M 3/073 |
| 2021/0184586 A1 | 6/2021 | Jin et al. | |
| 2022/0029540 A1 | 1/2022 | Zhang et al. | |
| 2022/0231600 A1 | 7/2022 | Jong et al. | |
| 2022/0231601 A1 | 7/2022 | Jong et al. | |

FOREIGN PATENT DOCUMENTS

| | | |
|---|---|---|
| CN | 109728718 A | 5/2019 |
| CN | 110581667 A | 12/2019 |
| CN | 110649814 | 1/2020 |
| CN | 114825911 A | 7/2022 |
| CN | 114825926 A | 7/2022 |
| EP | 3734825 A1 | 11/2020 |
| FR | 2996698 A1 | 4/2014 |
| JP | 5937442 B2 | 5/2016 |
| KR | 101710537 | 3/2017 |
| TW | 201810908 A | 3/2018 |
| WO | 2020112207 | 6/2020 |

OTHER PUBLICATIONS

Analog Devices, Inc., LTC7821 Hybrid Step-Down Synchronous Controller, Apr. 2018, in 36 pages.

Carvalho et al., "A Low-Volume Multi-Phase Interleaved DC-DC Converter for High Step-Down Applications with Auto-Balancing of Phase Currents" 2017 IEEE, in 7 pages.

Carvalho et al., "Digital PWM for Multi-Level Flying Capacitor Converters with Improved Output Resolution and Flying Capacitor Voltage Controller Stability" 2018 IEEE, in 7 pages.

Lang et al., "Solving the Power Density Challenge" Bodo's Power Systems dated Mar. 2020, in 2 pages.

Saggini et al., "A 99% Efficient Dual-Phase Resonant Switched-Capacitor-Buck Converter for 48 V Data Center Bus Conversions" IEEE Xplore downloaded May 25, 2020, in 6 pages.

Seo et al., "A 95%-Efficient 48V-to-1V/10A VRM Hybrid Converter Using Interleaved Dual Inductors" dated Oct. 7, 2018, in 6 pages.

"U.S. Appl. No. 17/152,065, Non Final Office Action dated Jul. 7, 2022", 10 pgs.

"U.S. Appl. No. 17/152,065, Response filed Jun. 16, 2022 to Restriction Requirement dated Jun. 13, 2022", 9 pgs.

"U.S. Appl. No. 17/152,065, Restriction Requirement dated Jun. 13, 2022", 6 pgs.

"U.S. Appl. No. 17/375,830, Non Final Office Action dated Jul. 21, 2022", 28 pgs.

"European Application Serial No. 21215787.9, Extended European Search Report dated Jun. 9, 2022", 8 pgs.

"European Application Serial No. 21215788.7, Extended European Search Report dated Jun. 7, 2022", 11 pgs.

Halamicek, Michael, et al., "Cross-Coupled Series-Capacitor Quadruple Step-Down Buck Converter", IEEE Applied Power Electronics Conference and Exposition (APEC), IEEE, (Mar. 15, 2020), 1-6.

Li, Cheng, et al., "A Novel Hybrid 4:1 Step Down Converter Using an Autotransformer with DC Winding Current", IEEE Energy Conversion Congress and Exposition (ECCE), IEEE, (Oct. 11, 2020), 173-180.

Wang, Chuang, et al., "A Two-Phase Three-Level Buck DC-DC Converter With X-Connected Flying Capacitors for Current Balancing", IEEE Solid-State Circuits Letters, IEEE, vol. 3, (Sep. 22, 2020), 442-445.

"Taiwanese Application Serial No. 111101218, Office Action dated Sep. 5, 2022", W/O English Translation, 9 pgs.

"U.S. Appl. No. 17/152,065, Notice of Allowance dated Oct. 26, 2022", 9 pgs.

"U.S. Appl. No. 17/152,065, Response filed Oct. 3, 2022 to Non Final Office Action dated Jul. 7, 2022", 12 pgs.

"U.S. Appl. No. 17/375,830, Final Office Action dated Oct. 31, 2022", 27 pgs.

"U.S. Appl. No. 17/375,830, Response filed Oct. 18, 22 to Non Final Office Action dated Jul. 21, 2022", 18 pgs.

"U.S. Appl. No. 17/375,830, Response filed Nov. 14, 22 to Final Office Action dated Oct. 31, 2022", 12 pgs.

* cited by examiner $$\text{DUTY CYCLE} = d = \frac{2V_O}{V_{IN}}$$

PULSE WIDTH MODULATION CONTROLLERS FOR HYBRID CONVERTERS

FIELD OF THE DISCLOSURE

Embodiments of the invention relate to electronic systems, and more particularly, to electronic power conversion.

BACKGROUND

A voltage regulator serves to generate a substantially constant output voltage from a poorly-specified and/or fluctuating supply voltage or other input voltage source. Series regulators and switching regulators are two common types of voltage regulators. Low dropout (LDO) series regulators provide good regulation with very low noise, however, the current supply from the regulated output comes directly from the supply voltage. Thus, an LDO series regulator's efficiency is limited by the ratio of the output voltage to the supply voltage, and thus the efficiency of the LDO series regulator drops rapidly as the supply voltage increases relative to the output voltage.

Switching regulators are generally more efficient than series regulators. A switching regulator employs one or more switches (for instance, power transistors) coupled in series and/or parallel with an output terminal that provides an output voltage to a load. Additionally, a controller turns the switches ON and OFF to control delivery of current pulses to the output terminal. One or more energy storage elements, such as inductor(s) and/or capacitor(s), can be used to convert the switched current pulses into a steady load current.

SUMMARY OF THE DISCLOSURE

Pulse width modulation (PWM) controllers for hybrid converters are provided herein. In certain embodiments, a PWM controller for a hybrid converter includes a threshold generation circuit for generating a threshold signal based on an output voltage of the hybrid converter, a threshold adjustment circuit for generating an adjusted threshold signal based on sensing a voltage of a flying capacitor of the hybrid converter, and a comparator that generates a comparison signal based on comparing the adjusted threshold signal to an indication of an inductor current of the hybrid converter. The output of the comparator is used for generating PWM control signals used for turning on and off the switches (for instance, power transistors) of the hybrid converter. By implementing the PWM controller in this manner, stable operation of the hybrid converter is achieved even when power stage mismatches are present and/or the PWM controller has asymmetries in circuitry used for generating the PWM controls signals of the hybrid converter's power stage(s).

In one aspect, a power conversion system includes a power converter and a PWM controller. The power converter is configured to generate a regulated output voltage based on an input voltage, and includes a first inductor, a first capacitor, and a first group of switches configured to control electrical connectivity of the first inductor and the first capacitor. The PWM controller includes a threshold generation circuit configured to generate a threshold signal based on the regulated output voltage, a first threshold adjustment circuit configured to generate a first adjusted threshold signal by adjusting the threshold signal based on the input voltage and a voltage of the first capacitor, a first comparator configured to compare a current through the first inductor to the first adjusted threshold signal, and a switch control circuit configured to generate at least one control signal for controlling the first group of switches based on an output of the first comparator.

In another aspect, a method of power conversion includes generating a regulated output voltage based on an input voltage using a power converter that includes a first inductor, a first capacitor, and a first group of switches for controlling electrical connectivity of the first inductor and the first capacitor, generating a threshold signal based on the regulated output voltage using a threshold generation circuit, generating a first adjusted threshold signal by adjusting the threshold signal based on the input voltage and a voltage of the first capacitor using a first threshold adjustment circuit, comparing a current through the first inductor to the first adjusted threshold signal using a first comparator, and controlling the first group of switches based on an output of the first comparator.

In another aspect, a PWM controller includes a threshold generation circuit configured to generate a threshold signal based on a regulated output voltage of a power converter, a first threshold adjustment circuit configured to generate a first adjusted threshold signal by adjusting the threshold signal based on an input voltage of the power converter and a first capacitor voltage of the power converter, a first comparator configured to compare a first inductor current of the power converter to the first adjusted threshold signal, and a switch control circuit configured to generate at least one switch control signal for the power converter based on an output of the first comparator.

DETAILED DESCRIPTION OF EMBODIMENTS

Figure 1A:
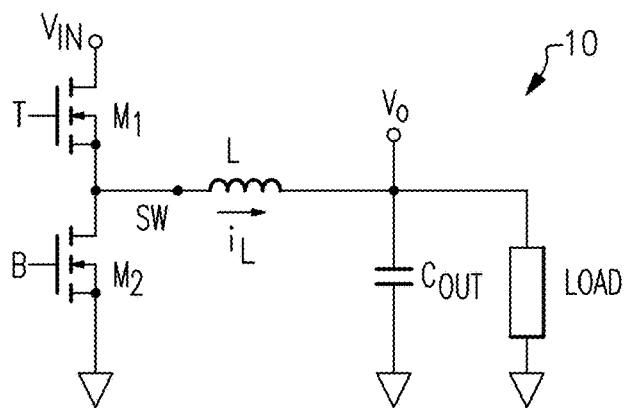
FIG. 1A is a schematic diagram of one example of a buck converter.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Figure 1B:
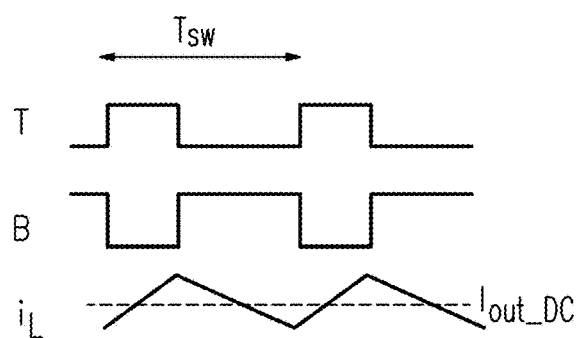
FIG. 1B is a graph showing one example of control signal and inductor current waveforms for the buck converter of FIG. 1A.
Figure 1C:
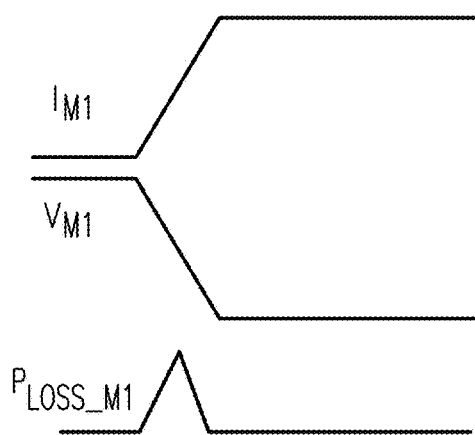
FIG. 1C is a graph showing one example of transistor current, transistor voltage, and transistor power loss for the buck converter of FIG. 1A.

FIG. 1A is a schematic diagram of one example of a buck converter 10. FIG. 1B is a graph showing one example of control signal and inductor current waveforms for the buck converter 10 of FIG. 1A. FIG. 1C is a graph showing one example of transistor drain current, transistor drain-to-source voltage, and transistor power loss for the buck converter 10 of FIG. 1A.

The buck converter 10 includes a top power transistor $M_1$, a bottom power transistor $M_2$, an inductor L, and an output capacitor $C_{OUT}$. The buck converter receives an input voltage $V_{IN}$ and generates an output voltage $V_O$ that is less than the input voltage VIN. The output voltage $V_O$ is provided to an external load (LOAD), in this example. The top power transistor $M_1$ is connected between the input voltage $V_{IN}$ and the switch node SW, the bottom power transistor $M_2$ is connected between the switch node SW and ground, the inductor L is connected between the switch node SW and the output voltage $V_O$, and the output capacitor $C_{OUT}$ is connected between the output voltage $V_O$ and ground.

In the example of FIG. 1A, the top power transistor $M_1$ is controlled by a top control signal T, and the bottom power transistor $M_2$ is controlled by a bottom control signal B. By adjusting or modulating the width of the top control signal T and the bottom control signal B, regulation of the output voltage $V_O$ is achieved.

For example, the top power transistor $M_1$ is turned on when the top control signal T is high, while the bottom power transistor $M_2$ is turned on when the complimentary bottom control signal B is high. When the top power transistor $M_1$ is on, the input voltage $V_{IN}$ is applied to the switch node SW and the current $i_L$ through the inductor L ramps up. When the bottom power transistor $M_2$ is on, the ground potential is applied to the switch node SW and the inductor current $i_L$ ramps down.

This operation repeats periodically, and the switching period is $T_{SW}$. The ratio of the on-time of top power transistor $M_1$ over the switching period $T_{SW}$ is referred to as duty cycle.

Since the ramp up slope of the inductor current $i_L$ is determined by the voltage difference between the switch node SW and the output voltage $V_O$, larger current ripple amplitude is present at lower switching frequency. Thus, to support a given DC output load current, a larger-sized inductor L is selected to avoid inductor saturation at peak current.

The on/off transition of a power transistor for a power converter cannot be done in zero time. During the transition time, the drain to source voltage and current through the power transistor are both non-zero. This leads to the switching loss of the power transistor for each transition from on to off, or from off to on state. The higher the drain to source voltage that the power transistor blocks, the higher the switching loss that the power transistor has each time it switches.

For instance, in the example of FIG. 1C, waveforms for the voltage, current, and power loss of the top power transistor $M_1$ are shown for one example state transition.

The switching loss limits the practical maximum switching frequency. However, high switching frequency is desired for a compact size power supply.

Figure 2A:
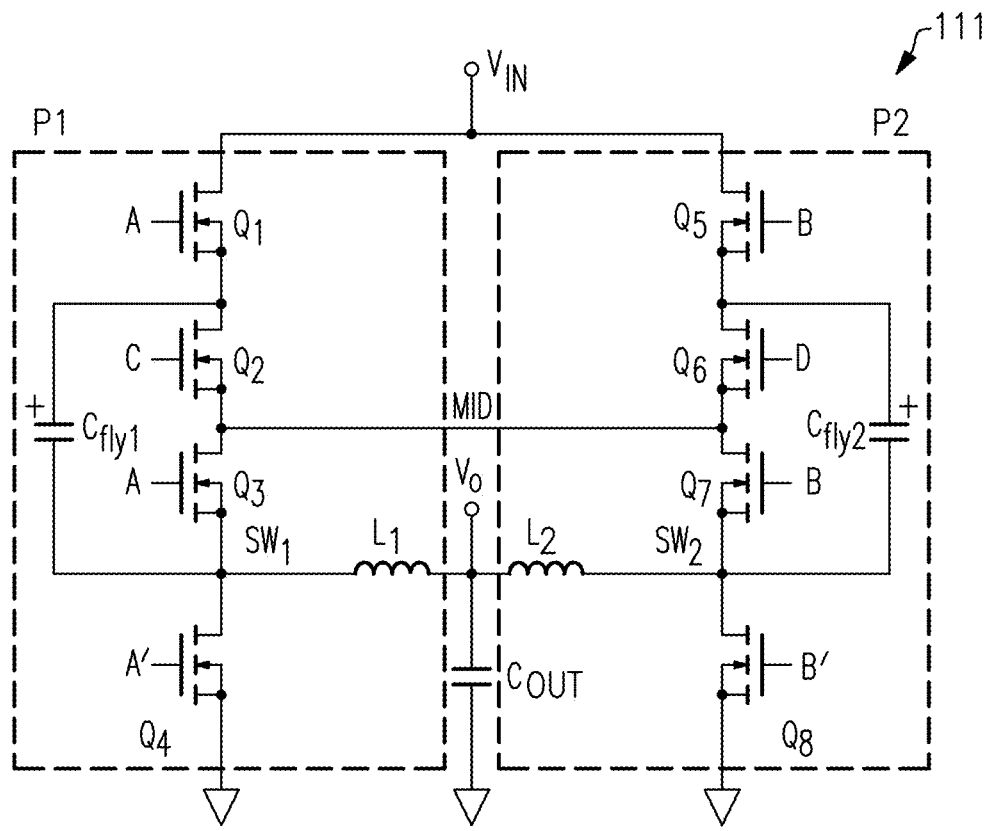
FIG. 2A is a schematic diagram of one embodiment of a hybrid converter.
Figure 2B:
FIG. 2B is a schematic diagram of one embodiment of control logic circuitry for the hybrid converter of FIG. 2A.
Figure 2C:
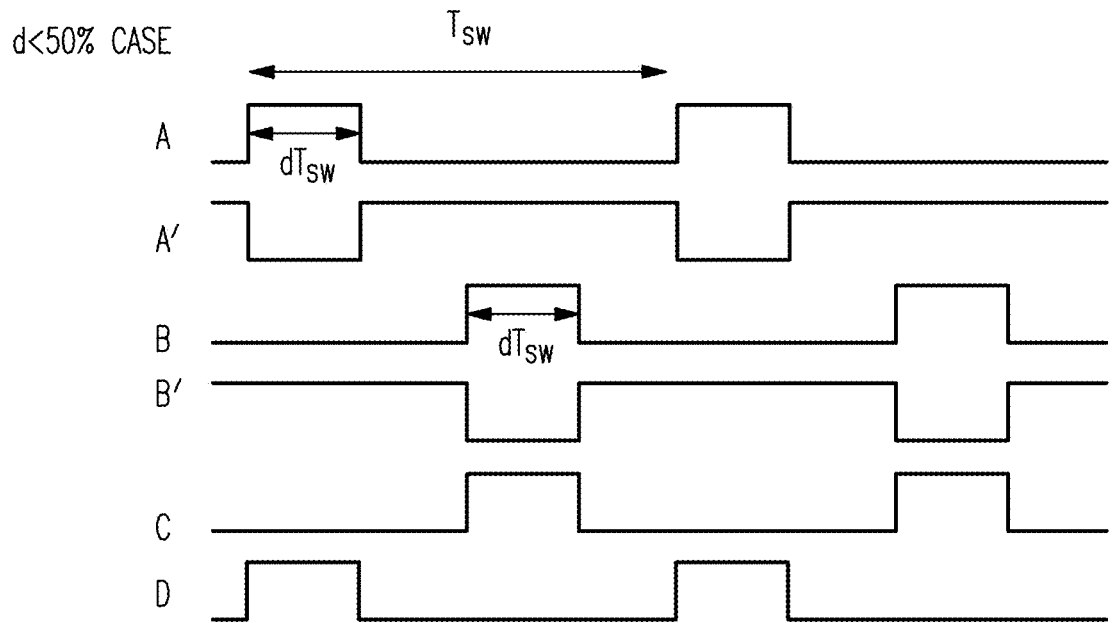
FIG. 2C is a schematic diagram of one example of low duty cycle regulation for the hybrid converter of FIG. 2A.
Figure 2D:
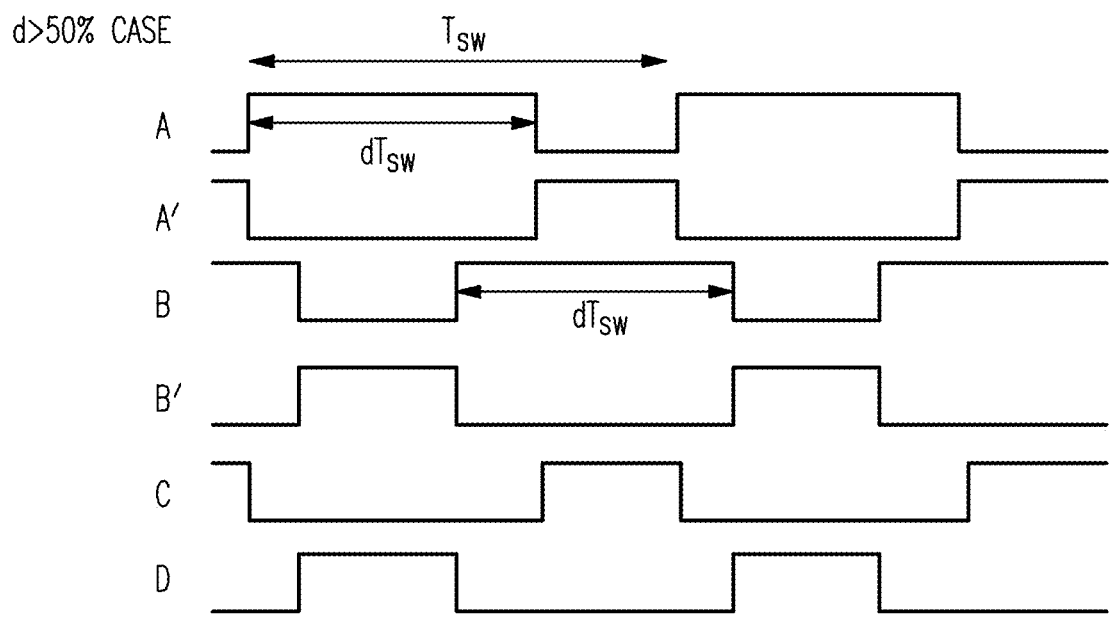
FIG. 2D is a schematic diagram of one example of high duty cycle regulation for the hybrid converter of FIG. 2A.

FIG. 2A is a schematic diagram of one embodiment of a hybrid converter 111. FIG. 2B is a schematic diagram of one embodiment of control logic circuitry for the hybrid converter 111 of FIG. 2A. FIG. 2C is a schematic diagram of one example of low duty cycle regulation for the hybrid converter 111 of FIG. 2A. FIG. 2D is a schematic diagram of one example of high duty cycle regulation for the hybrid converter 111 of FIG. 2A.

The hybrid converter 111 includes a first half power stage P1 including a first power transistor $Q_1$, a second power transistor $Q_2$, a third power transistor $Q_3$, a fourth power transistor $Q_4$, a first inductor $L_1$, and a first switched capacitor $C_{fly1}$ (also referred to herein as a flying capacitor). The hybrid converter 111 further includes a second half power stage P2 including a fifth power transistor $Q_5$, a sixth power transistor $Q_6$, a seventh power transistor $Q_7$, an eight power transistor $Q_8$, a second inductor $L_2$, and a second flying capacitor $C_{fly2}$. The hybrid converter 111 provides regulation using at least one inductor and at least one switched capacitor, and thus is a hybrid converter.

As shown in FIG. 2A, the hybrid converter 111 receives an input voltage $V_{IN}$ from an input terminal and provides an output voltage $V_O$ to an output terminal that is connected to an output capacitor $C_{OUT}$. Although not shown in FIG. 2A, the output terminal of the hybrid converter 111 can be coupled to any desired load. The hybrid converter 111 operates with a duty cycle d that changes in relation to a ratio of $2V_O/V_{IN}$, in this embodiment.

As shown in FIG. 2A, the first power transistor $Q_1$ and the second power transistor $Q_2$ are connected in series between the input voltage $V_{IN}$ and a middle node MID, while the first flying capacitor $C_{fly1}$ is connected between a source of the first power transistor $Q_1$ and a first switch node $SW_1$. The fourth power transistor $Q_4$ is connected between the first switch node $SW_1$ and ground, while the first inductor $L_1$ is connected between the first switch node $SW_1$ and the output voltage $V_O$. The fifth power transistor $Q_5$ and the sixth power transistor $Q_6$ are connected in series between the input voltage $V_{IN}$ and the middle node MID, while the second flying capacitor $C_{fly5}$ is connected between a source of the fifth power transistor $Q_5$ and a second switch node $SW_2$. The eighth power transistor $Q_8$ is connected between the second switch node $SW_2$ and ground, while the second inductor $L_2$ is connected between the second switch node $SW_2$ and the output voltage $V_O$. The third power transistor $Q_3$ is connected between the first switch node $SW_1$ and the middle node MID, while the seventh power transistor $Q_7$ is connected between the second switch node $SW_2$ and the middle node MID.

In comparison to the buck converter 10 of FIG. 1A, the hybrid converter 111 of FIG. 2A operates with reduced switching loss of the power transistors, thereby allowing operation at higher frequency. Moreover, the hybrid converter 111 operates with high efficiency, even when $V_O$ is a large step down voltage from $V_{IN}$ (for instance, when stepping down with a ratio of 4:1 or more, for instance, from 48V to 12V).

As shown in FIGS. 2A-2D, the first through eighth power transistors $Q_1$-$Q_8$ are controlled by control signals A, A', B, B', C and D, where A' is complimentary signal of A and B' is complimentary signal of B. Since this example implements the power transistors using n-type field-effect transistors (NFETs), when a given control signal is high, the corresponding power transistor is on. However, implementations using p-type transistors, n-type and p-type transistors, and/or other types of switches are also possible. As shown in the example of FIG. 2B, D is generated by (B AND A') using a first AND gate, while C is generated by (A AND B') using a second AND gate.

When operating in the steady state and when the hybrid converter 111 is stable, the flying capacitors hold a DC voltage equal to about ½ of $V_{IN}$.

Figures 3A, 3B, 3C:
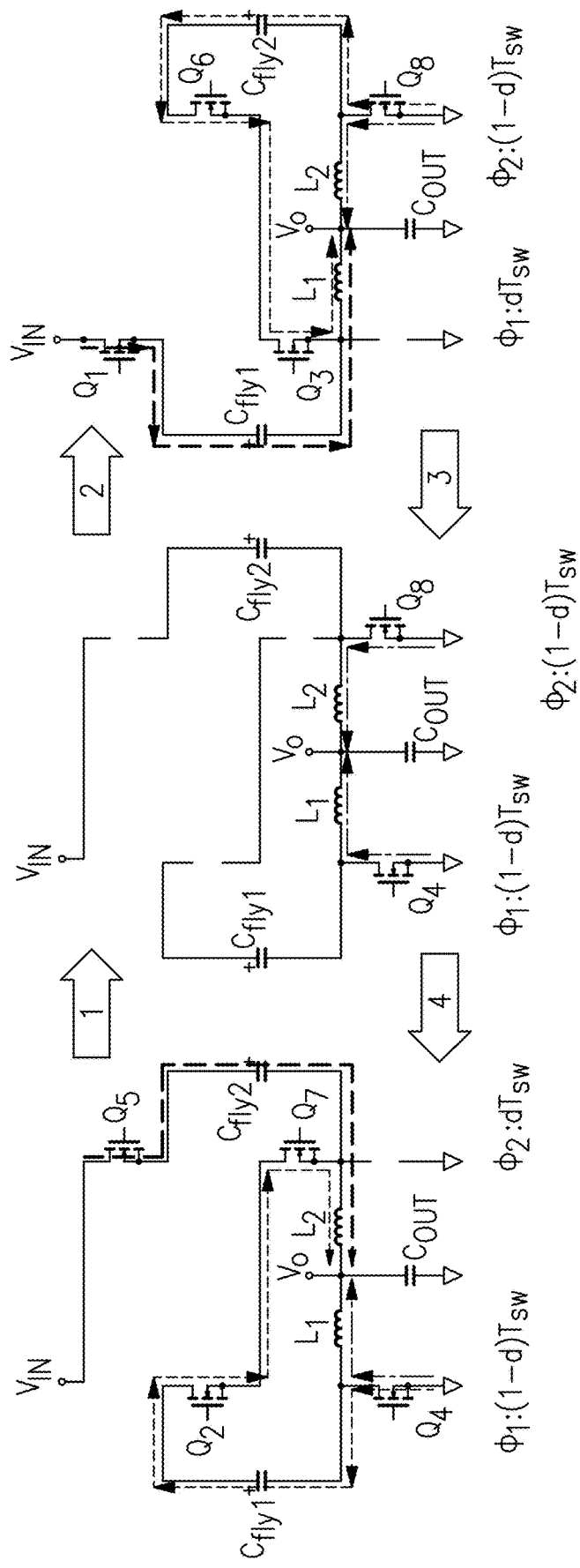
FIG. 3A is a schematic diagram of a first operating phase of the hybrid converter of FIG. 2A for low duty cycle regulation according to one embodiment.
FIG. 3B is a schematic diagram of a second and fourth operating phase of the hybrid converter of FIG. 2A for low duty cycle regulation according to one embodiment.
FIG. 3C is a schematic diagram of a third operating phase of the hybrid converter of FIG. 2A for low duty cycle regulation according to one embodiment.

FIG. 3A is a schematic diagram of a first operating phase of the hybrid converter 111 of FIG. 2A for low duty cycle regulation according to one embodiment.

As shown in FIG. 3A, power transistors $Q_2$, $Q_4$, $Q_5$, and $Q_7$ are turned on, while the remaining power transistors are turned off. Thus, the second flying capacitor $C_{fly2}$ and the first flying capacitor $C_{fly1}$ are connected in series between the input voltage $V_{IN}$ and ground. Additionally, the current through inductor $L_1$ ramps down while the current through inductor $L_2$ ramps up.

FIG. 3B is a schematic diagram of a second and fourth operating phase of the hybrid converter 111 of FIG. 2A for low duty cycle regulation according to one embodiment.

As shown in FIG. 3B, the power transistors $Q_4$ and $Q_8$ are turned on, while the remaining power transistors are turned off. Thus, the current through inductor $L_1$ and the current through inductor $L_2$ both ramp down.

FIG. 3C is a schematic diagram of a third operating phase of the hybrid converter 111 of FIG. 2A for low duty cycle regulation according to one embodiment.

As shown in FIG. 3C, power transistors $Q_1$, $Q_3$, $Q_6$, and $Q_8$ are turned on, while the remaining power transistors are turned off. Thus, the first flying capacitor $C_{fly1}$ and the second flying capacitor $C_{fly2}$ are connected in series between the input voltage $V_{IN}$ and ground. Additionally, the current through inductor $L_1$ ramps up while the current through inductor $L_2$ ramps down.

With reference to FIGS. 3A-3C, the hybrid converter 111 can provide regulation by cycling the hybrid converter 111 through the first operating phase (FIG. 3A), the second operating phase (FIG. 3B), the third operating phase (FIG. 3C), and the fourth operating phase (FIG. 3B). Additionally, the regulation cycle can be repeated by returning to the first operating phase (FIG. 3A) from the fourth operating phase (FIG. 3B). Such operation can correspond to low duty cycle (d) operation, for instance, d less than fifty percent.

Figures 4A, 4B, 4C:
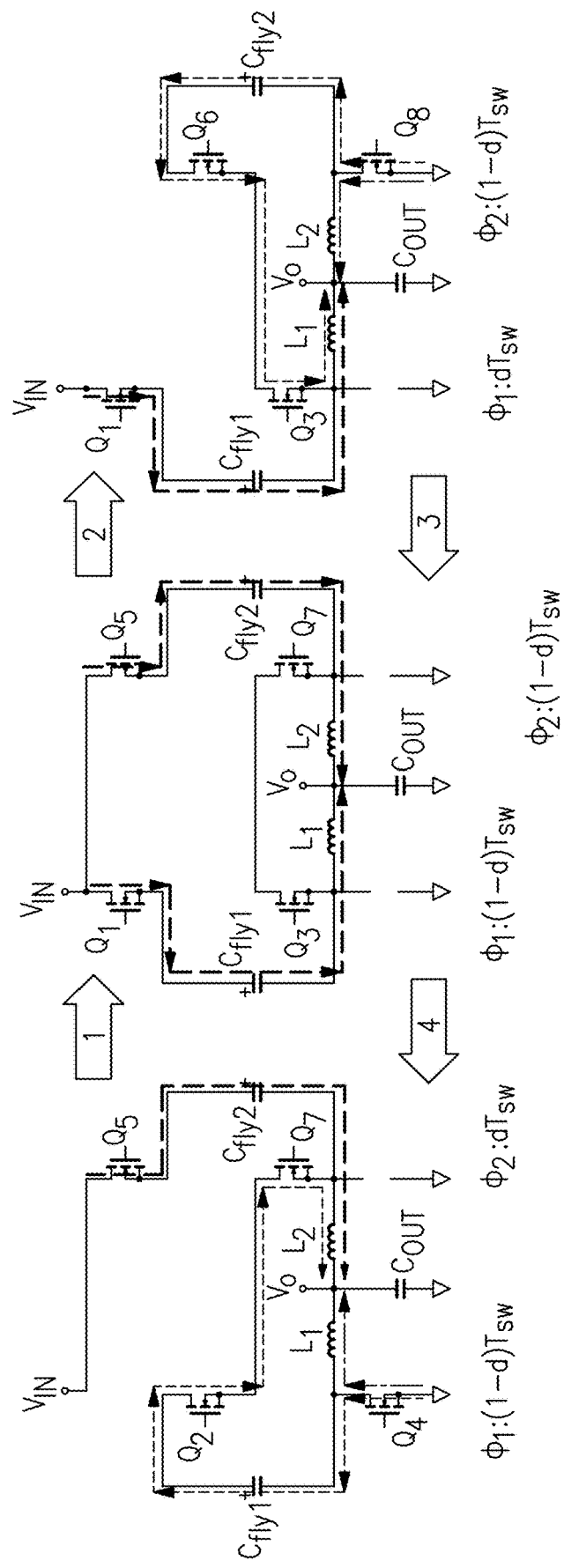
FIG. 4A is a schematic diagram of a first operating phase of the hybrid converter of FIG. 2A for high duty cycle regulation according to one embodiment.
FIG. 4B is a schematic diagram of a second and fourth operating phase of the hybrid converter of FIG. 2A for high duty cycle regulation according to one embodiment.
FIG. 4C is a schematic diagram of a third operating phase of the hybrid converter of FIG. 2A for high duty cycle regulation according to one embodiment.

FIG. 4A is a schematic diagram of a first operating phase of the hybrid converter 111 of FIG. 2A for high duty cycle regulation according to one embodiment.

As shown in FIG. 4A, power transistors $Q_2$, $Q_4$, $Q_5$, and $Q_7$ are turned on, while the remaining power transistors are turned off. Thus, the second flying capacitor $C_{fly2}$ and the first flying capacitor $C_{fly1}$ are connected in series between the input voltage $V_{IN}$ and ground. Additionally, the current through inductor $L_1$ ramps down while the current through inductor $L_2$ ramps up.

FIG. 4B is a schematic diagram of a second and fourth operating phase of the hybrid converter 111 of FIG. 2A for high duty cycle regulation according to one embodiment.

As shown in FIG. 4B, the power transistors $Q_1$, $Q_3$, $Q_5$, and $Q_7$ are turned on, while the remaining power transistors are turned off. Thus, the current through inductor $L_1$ and the current through inductor $L_2$ both ramp up. Furthermore, a path through power transistors is $Q_3$ and $Q_7$ is provided to connect the second end of the first flying capacitor $C_{fly1}$ to the second end of the second flying capacitor $C_{fly2}$.

FIG. 4C is a schematic diagram of a third operating phase of the hybrid converter 111 of FIG. 2A for high duty cycle regulation according to one embodiment.

As shown in FIG. 4C, power transistors $Q_1$, $Q_3$, $Q_6$, and $Q_8$ are turned on, while the remaining power transistors are turned off. Thus, the first flying capacitor $C_{fly1}$ and the second flying capacitor $C_{fly2}$ are connected in series between the input voltage $V_{IN}$ and ground. Additionally, the current through inductor $L_1$ ramps up while the current through inductor $L_2$ ramps down.

With reference to FIGS. 4A-4C, the hybrid converter 111 can provide by regulation by cycling the hybrid converter 111 through the first operating phase (FIG. 4A), the second operating phase (FIG. 4B), the third operating phase (FIG. 4C), and the fourth operating phase (FIG. 4B). Additionally, the regulation cycle can be repeated by returning to the first operating phase (FIG. 4A) from the fourth operating phase (FIG. 4B). Such operation can correspond to high duty cycle (d) operation, for instance, d greater than or equal to fifty percent.

Figure 5:
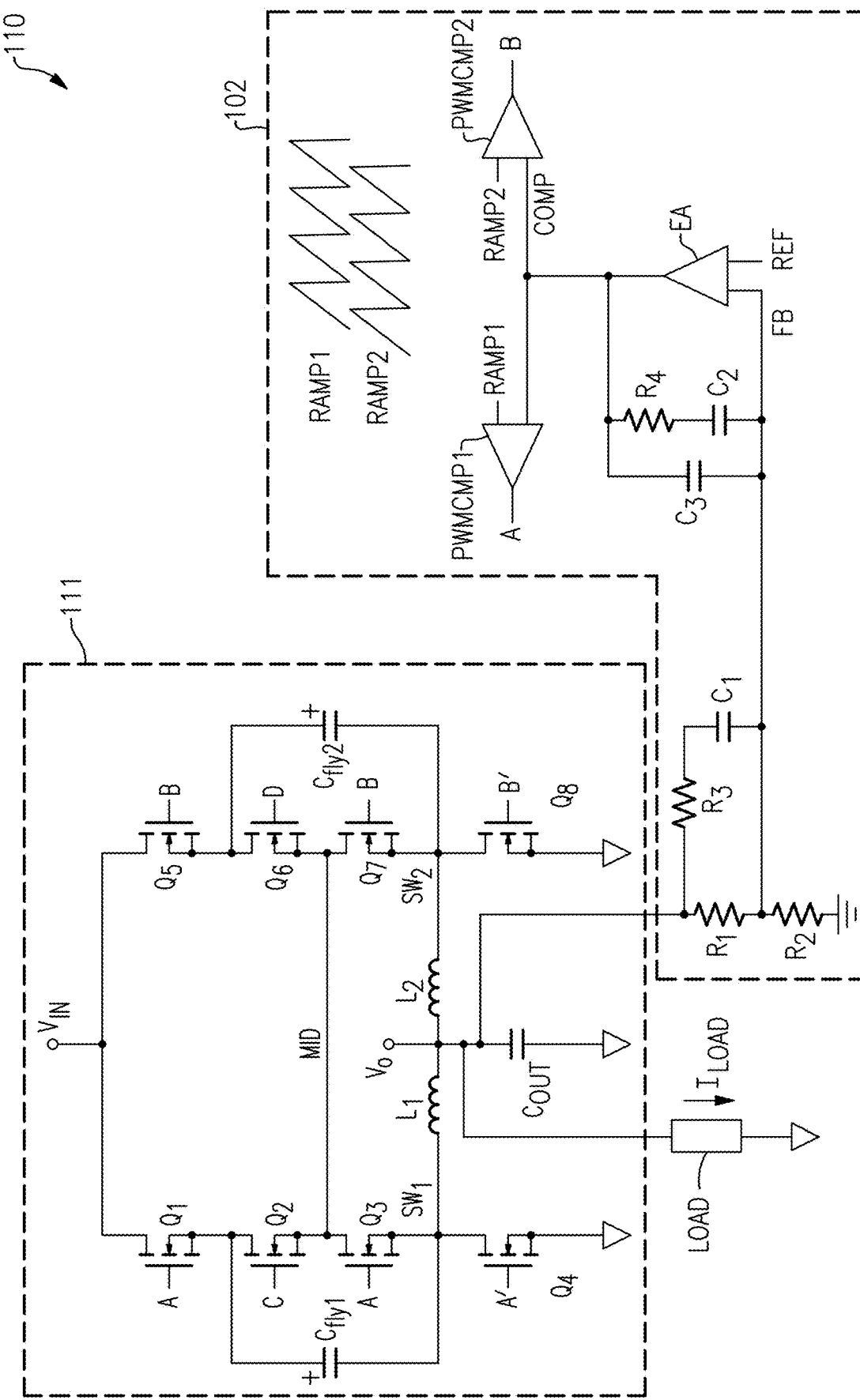
FIG. 5 is a schematic diagram of a hybrid power conversion system according to one embodiment.

FIG. 5 is a schematic diagram of a hybrid power conversion system 110 according to one embodiment. The hybrid power conversion system 110 includes a hybrid converter 111 and a PWM controller 102. As shown in FIG. 5, the output voltage $V_O$ of the hybrid converter 111 is provided to a load and also sensed by the PWM controller 102 to aid in generating control signals for the hybrid converter's power transistors.

In the illustrated embodiment, the PWM controller 102 includes a first resistor $R_1$, a second resistor $R_2$, a third resistor $R_3$, a fourth resistor $R_4$, a first capacitor $C_1$, a second capacitor $C_2$, a third capacitor $C_3$, an error amplifier EA, a first comparator PWMCMP1, and a second comparator PWMCMP2.

The PWM controller 102 provides closed loop feedback to the hybrid converter 111. For example, the first resistor $R_1$ and the second resistor $R_2$ serve as a voltage divider to generate a feedback voltage FB based on dividing down the output voltage $V_O$. The error amplifier EA amplifies the error between the feedback voltage FB and a DC reference voltage REF to generate a comparison threshold signal COMP.

The first comparator PWMCMP1 generates a first PWM control signal A based on comparing the comparison threshold signal COMP to a first sawtooth ramp signal RAMP1, while the second comparator PWMCMP2 generates a second PWM control signal B based on comparing the comparison threshold signal COMP to a second sawtooth ramp signal RAMP2. A third PWM control signal C and a fourth PWM control signal D can be generated using the configuration of FIG. 2B, while inverters can be used to generate logically inverted versions of any of the PWM control signals.

With continuing reference to FIG. 5, the first and second sawtooth ramp signals RAMP1 and RAMP2 can be generated in a wide variety of ways, and can have a phase difference of about 180 degrees and correspond to a sensed amount of current flowing through the first inductor $L_1$ and the second inductor $L_2$, respectively.

When the feedback voltage FB is lower than the DC reference voltage REF, the comparison threshold signal COMP goes up and the duty cycle d increases. In contrast, when the feedback voltage FB is higher than the DC reference voltage RF, the comparison threshold signal COMP goes down and the duty cycle d decreases. Accordingly, regulation of the output voltage $V_O$ is provided. To provide stability compensation, the PWM controller 102 includes the third resistor $R_3$, the fourth resistor $R_4$, the first capacitor $C_1$, the second capacitor $C_2$, and the third capacitor $C_3$.

Figure 6A:
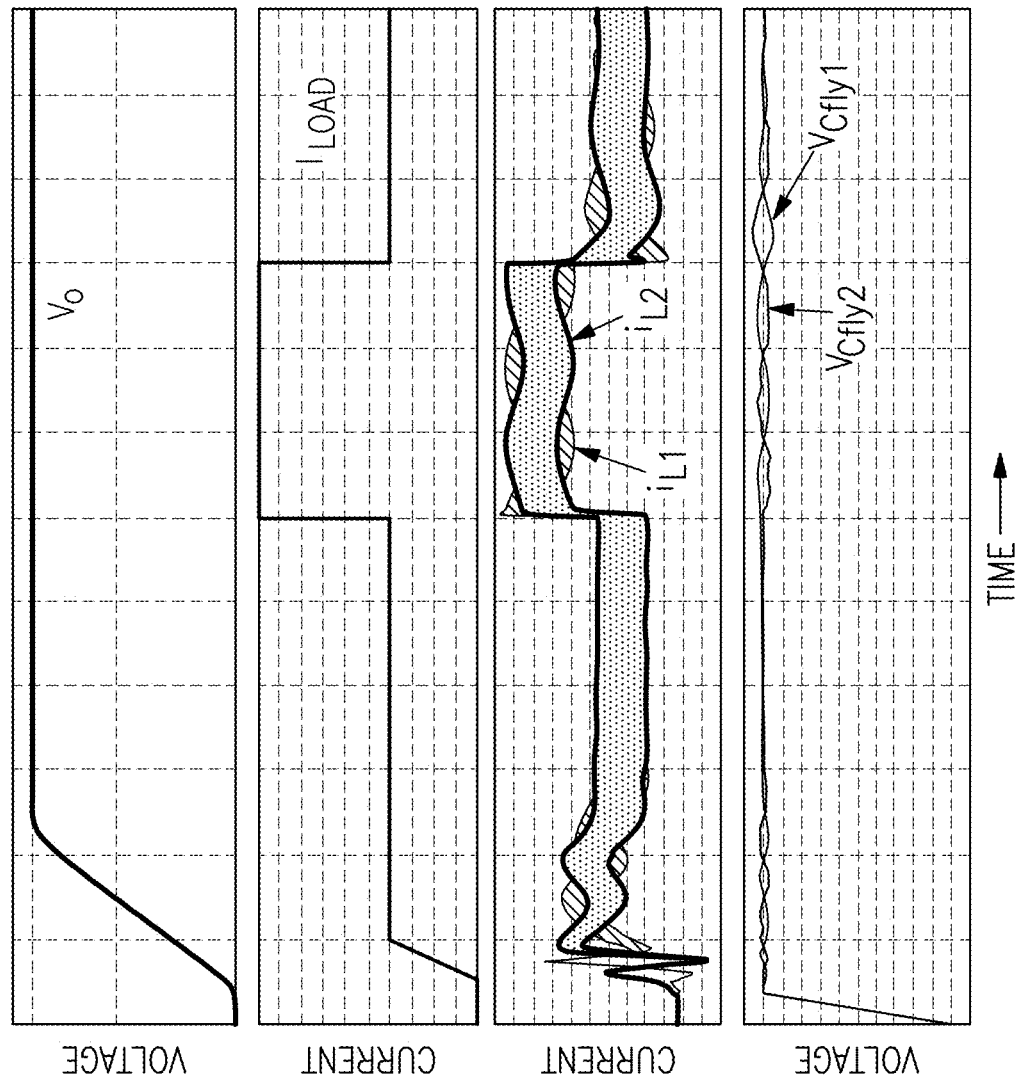
FIG. 6A is one example of a transient performance simulation without power stage mismatch for the hybrid power conversion system of FIG. 5.
Figure 6B:
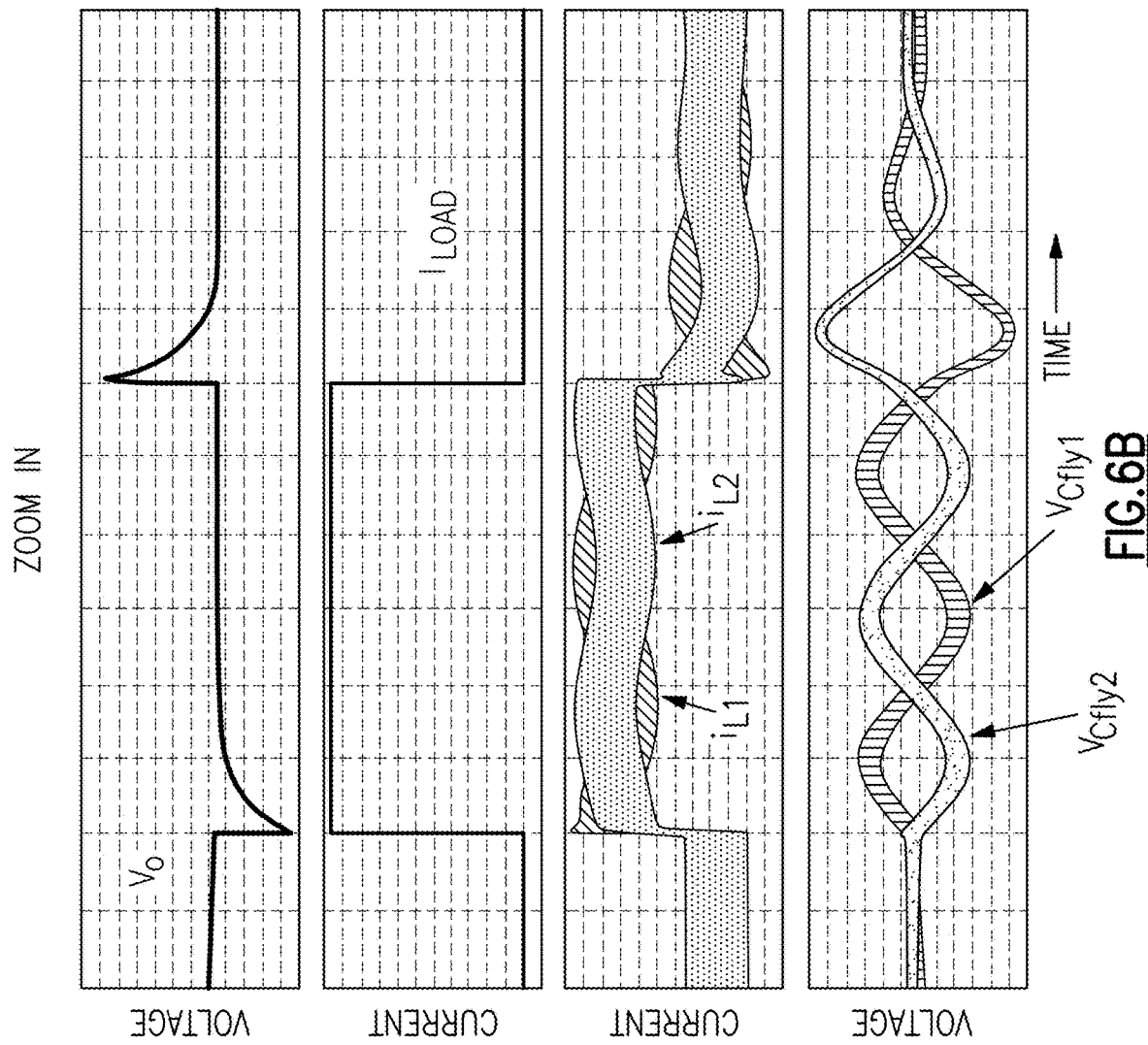
FIG. 6B is an expanded portion of the transient performance simulation of FIG. 6A.

FIG. 6A is one example of a transient performance simulation without power stage mismatch for the hybrid power conversion system 110 of FIG. 5. FIG. 6B is an expanded portion of the transient performance simulation of FIG. 6A.

The simulation observes the transient response of the hybrid converter 111 under a load current step change (current step in $I_{LOAD}$) in which the capacitances of the first flying capacitor $C_{fly1}$ and the second flying capacitor $C_{fly2}$ are equal and in which the inductances of the first inductor $L_1$ and the second inductor $L_2$ are equal, and the comparators in PWM controller 102 have the same delay and input offset.

As shown in FIGS. 6A and 6B, the output voltage $V_O$ settles down after a brief and momentary deviation and returns to voltage regulation without oscillation. Thus, the stability compensation is properly operating under the simulated conditions.

Figure 7A:
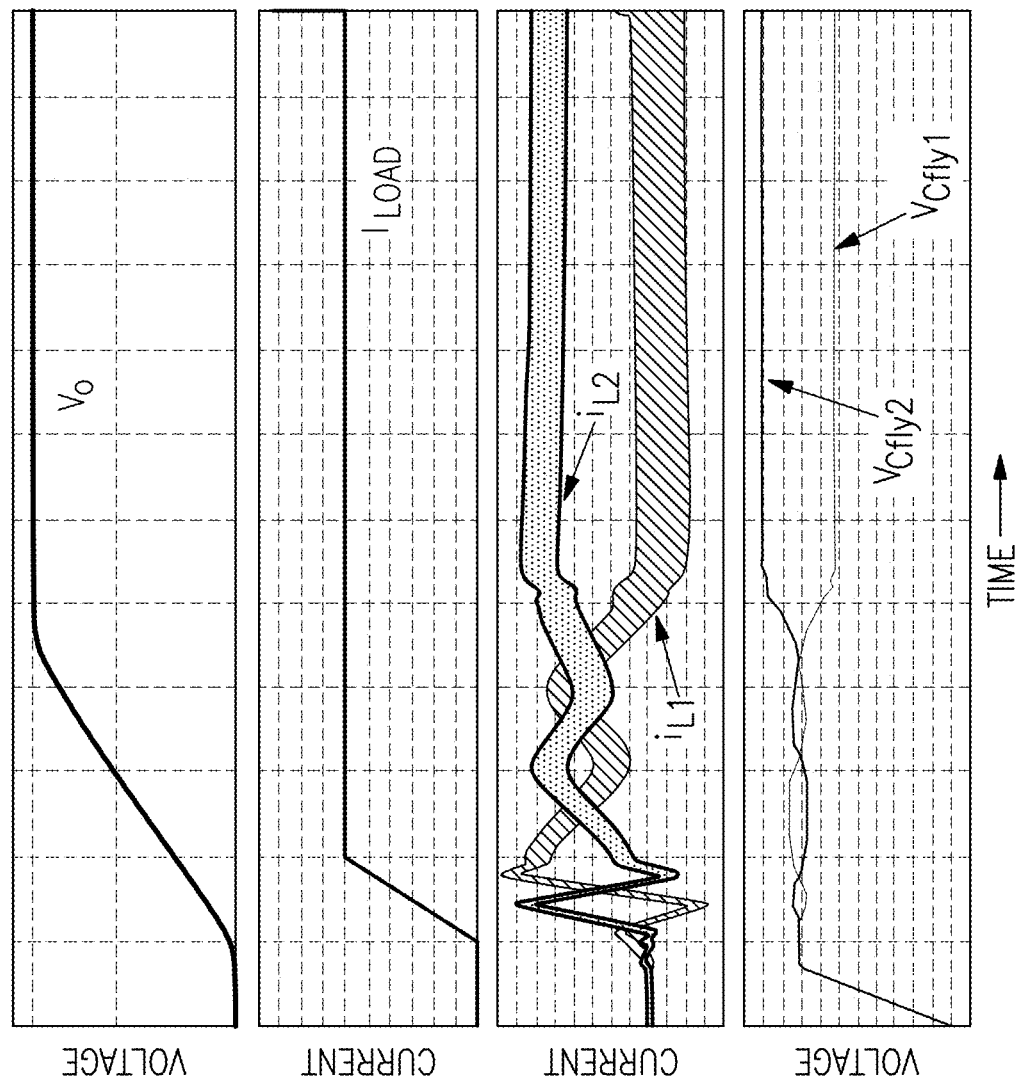
FIG. 7A is one example of a transient performance simulation with power stage mismatch for the hybrid power conversion system of FIG. 5.
Figure 7B:
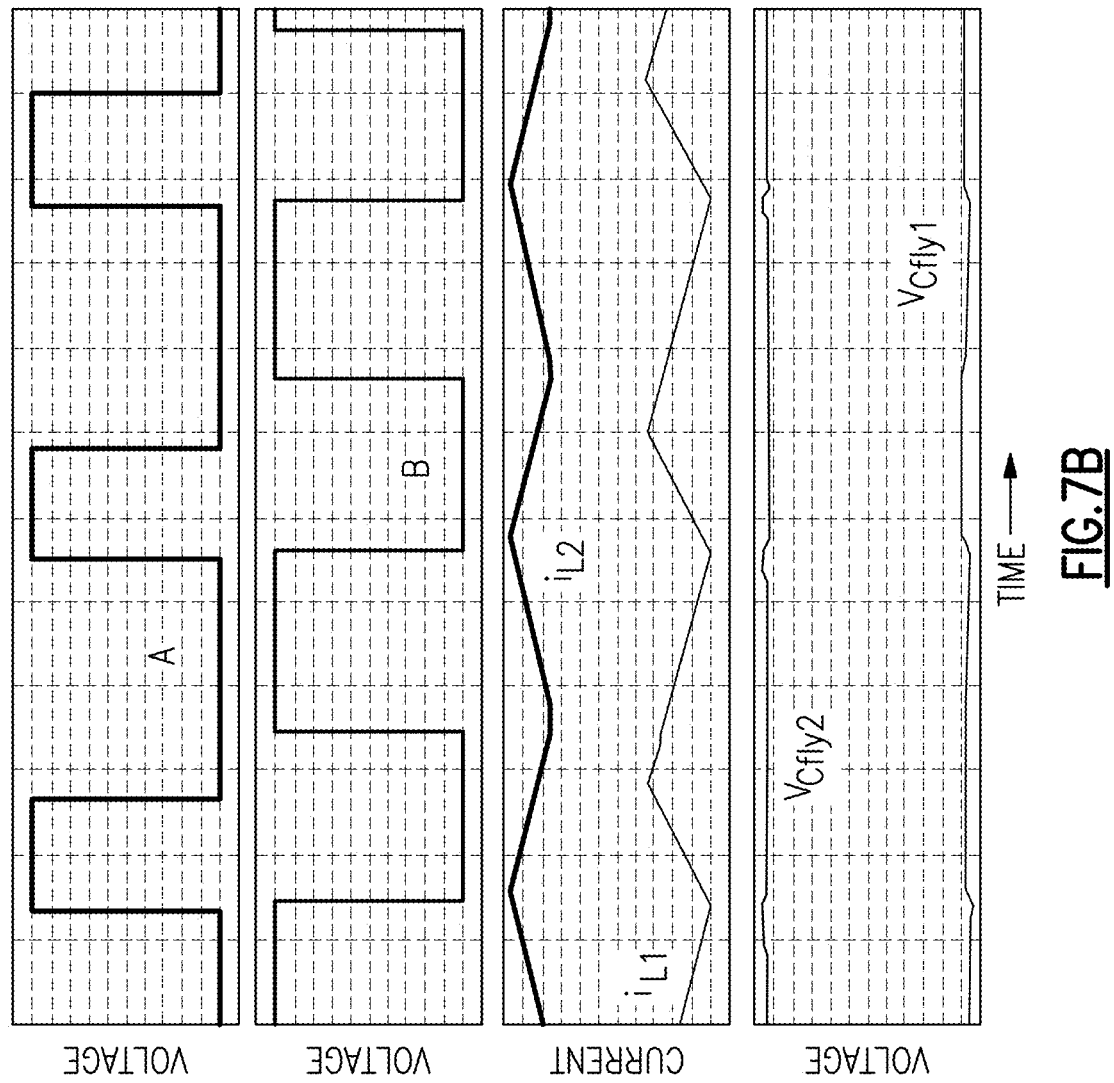
FIG. 7B is an expanded portion of the transient performance simulation of FIG. 7A.

FIG. 7A is one example of a transient performance simulation with power stage mismatch for the hybrid power conversion system 110 of FIG. 5. FIG. 7B is an expanded portion of the transient performance simulation of FIG. 7A.

In reality, the hardware circuit components of a hybrid converter are never exactly identical. Thus, the first half power stage P1 and the second half power stage P2 of the hybrid converter 111 of FIGS. 2A and 5 can suffer from a number of mismatches including, but not limited to, imbalance in comparator delays, differences in the capacitances of the first flying capacitor $C_{fly1}$ and the second flying capacitor $C_{fly2}$, and/or differences in the inductances of the first inductor $L_1$ and the second inductor $L_2$.

The simulations of FIGS. 7A and 7B are identical to the simulations of FIGS. 6A and 6B, except that the inductance of the first inductor $L_1$ is less than the inductance of the second inductor $L_2$ in the simulations of FIGS. 7A and 7B.

As shown in FIGS. 7A and 7B, the inductor mismatch results in the voltages across the first flying capacitor $C_{fly1}$ and the second flying capacitor $C_{fly2}$ of the hybrid converter 111 running away and the currents through the first inductor $L_1$ and the second inductor $L_2$ being non-equal. This in turn can cause excessive power loss on the hybrid converter 111, give rise to reliability problems, and/or lead to immediate circuit damage (for instance, circuit blow up) due to electrical overstress on capacitors and/or power transistors.

PWM controllers for hybrid converters are provided herein. In certain embodiments, a PWM controller for a hybrid converter includes a threshold generation circuit for generating a threshold signal based on an output voltage of the hybrid converter, a threshold adjustment circuit for generating an adjusted threshold signal based on sensing a voltage of a flying capacitor of the hybrid converter, and a comparator that generates a comparison signal based on comparing the adjusted threshold signal to an indication of an inductor current of the hybrid converter. The output of the comparator is used for generating PWM control signals used for turning on and off the switches (for instance, power transistors) of the hybrid converter.

By implementing the PWM controller in this manner, stable operation of the hybrid converter is achieved even when power stage mismatches are present and/or the PWM controller has asymmetries in circuitry used for generating the PWM controls signals of the hybrid converter's power stage(s).

Figure 8:
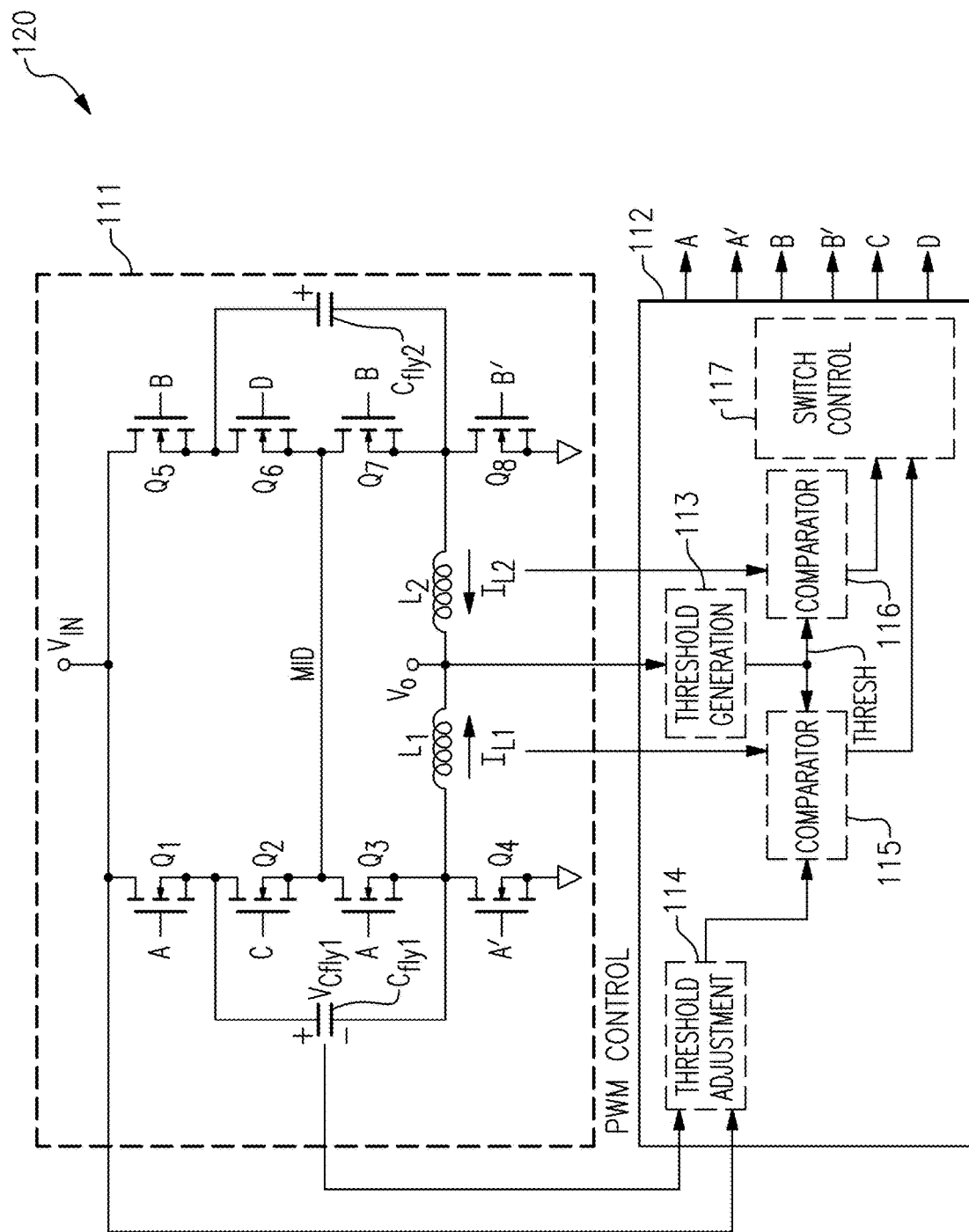
FIG. 8 is a schematic diagram of a hybrid power conversion system according to another embodiment.

FIG. 8 is a schematic diagram of a hybrid power conversion system 120 according to another embodiment. The hybrid power conversion system 120 includes a hybrid converter 111 and a PWM controller 112.

In the illustrated embodiment, the PWM controller 112 includes a threshold generation circuit 113, a threshold adjustment circuit 114, a first comparator 115, a second comparator 116, and a switch control circuit 117.

The threshold generation circuit 113 generates a threshold signal THRESH based on the output voltage $V_O$. The threshold signal THRESH can be generated in a wide variety of ways including, but not limited to, using an error amplifier that compares a fraction of the output voltage $V_O$ to a reference signal. The threshold signal THRESH is provided to the first comparator 115 and the second comparator 116, in this example.

As shown in FIG. 8, the PWM controller 112 includes the threshold adjustment circuit 114 for adjusting the comparison threshold of the first comparator 115 based on the first flying capacitor voltage $V_{Cfly1}$ and the input voltage $V_{IN}$. Such adjustment can be based on a comparison of the first flying capacitor voltage $V_{Cfly1}$ to a fraction of the input voltage $V_{IN}$.

Although an example with adjustment of the threshold of the first comparator 114 is shown, the teachings herein are also applicable to configurations in which the threshold of the second comparator 116 is adjusted as well as to configurations in which both the threshold of the first comparator 115 and the second comparator 116 are separately adjusted. For example, the adjusted threshold of the second comparator 116 can be based on a comparison of the second flying capacitor voltage $V_{Cfly2}$ to a fraction of the input voltage $V_{IN}$.

The first comparator 115 compares the adjusted threshold to the sensed current through the first inductor $L_1$. Additionally, the second comparator 116 compares the threshold signal THRESH to the sensed current through the second inductor $L_2$.

The current through the first inductor $L_1$ and the current through the second inductor $L_2$ can be sensed in any suitable way. In a first example, a small resistor is included in series with an inductor, and the detected voltage across the small resistor is used to sense the current through the inductor. In a second example, DC resistance (DCR) sensing of an inductor is used to sense the current through the inductor. DCR sensing can include connecting a resistor-capacitor (RC) network in parallel to the inductor, and sizing the product of the resistance and capacitance values of the RC network to be about equal to the ratio of the inductor's inductance to the inductor's parasitic resistance. When configured in this manner, a voltage across the capacitor of the RC network is proportional to the current through the inductor.

Although two examples of inductor current sensing have been provided, any suitable technique for measuring inductor current can be used.

The switch control circuit 117 generates various controls signals (A, A', B, B', C, and D, in this example) for turning on or off the power transistors of the hybrid converter 111. The pulse widths of the control signals are controlled based on results of the comparisons generated from the first comparator 115 and the second comparator 116.

By implementing the PWM controller 112 with threshold adjustment, compensation for asymmetries between the first half power stage and the second half power stage is provided. Such asymmetry can include mismatch between $C_{Fly1}/C_{fly2}$, mismatch between $L_1/L_2$, and/or mismatch in delays of the first comparator 115 and the second comparator 116.

In certain embodiments herein, a PWM controller (for instance, the PWM controller 112 of FIG. 8) is implemented on a semiconductor die. Additionally, a hybrid converter (for instance, the hybrid converter 111 of FIG. 8) may be implemented in part using off-chip components, such as discrete power transistors for enhanced power handling and/or heat dissipation capabilities.

Figure 9:
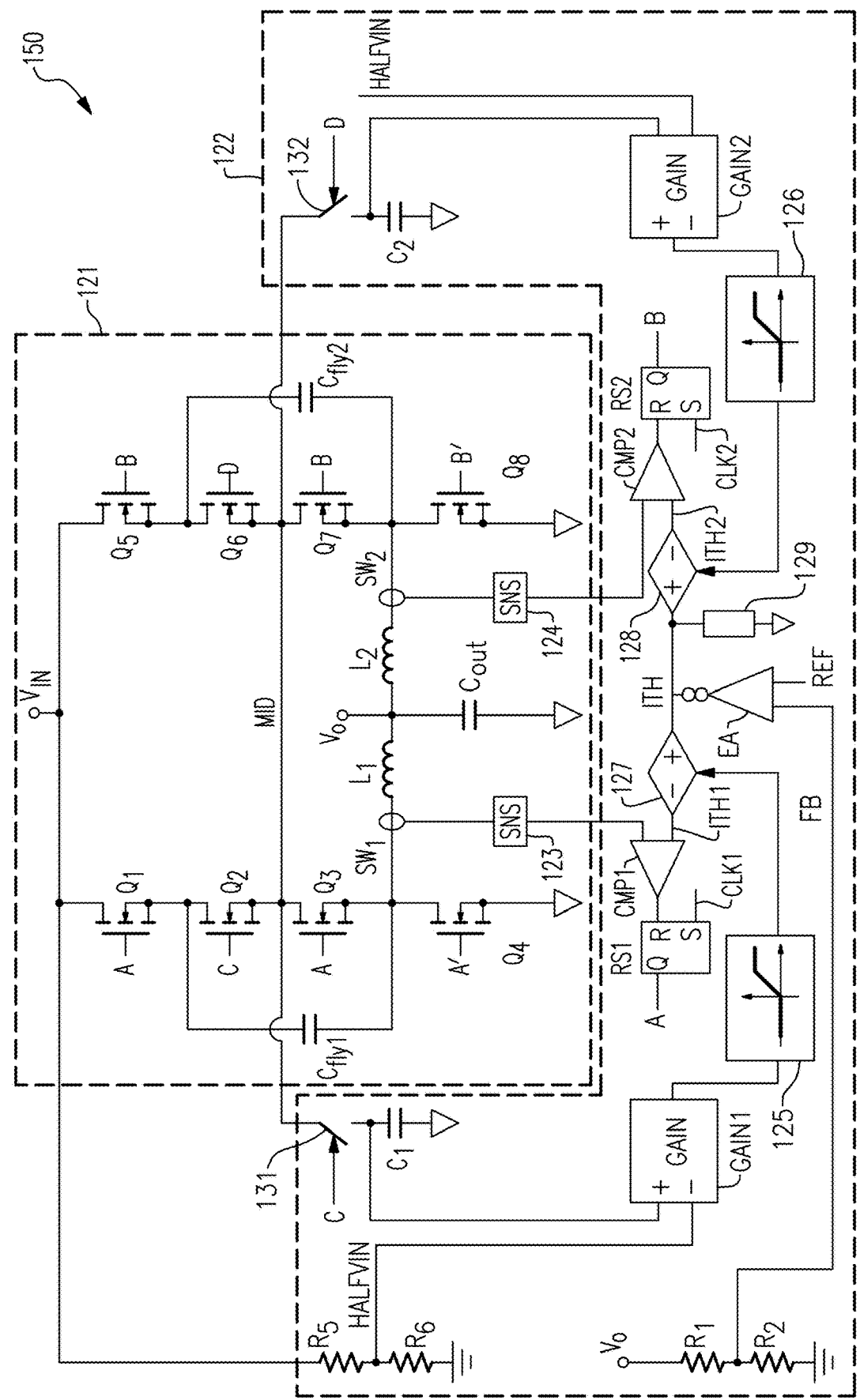
FIG. 9 is a schematic diagram of a hybrid power conversion system according to another embodiment.

FIG. 9 is a schematic diagram of a hybrid power conversion system 150 according to another embodiment. The hybrid power conversion system 150 includes a hybrid converter 121 and a PWM controller 122.

The hybrid converter 121 of FIG. 9 is similar to the hybrid converter 111 of FIG. 2A, except that the hybrid converter 121 further includes a first current sensing circuit 123 for sensing the current through the first inductor $L_1$ and a second current sensing circuit 124 for sensing the current through inductor $L_2$. The first current sensing circuit 123 and the second current sensing current 124 can provide current sensing in a wide variety of ways, including, but not limited to, DCR sensing and/or by sensing a voltage across a series resistor.

In the illustrated embodiment, the PWM controller 122 includes a first resistor $R_1$, a second resistor $R_2$, an error amplifier EA, a first half-range limiter 125, a second half-range limiter 126, a first controlled voltage source 127, a second controlled voltage source 128, an amplifier stability network 129, a first comparator CMP1, a second comparator CMP2, a first set/reset (S/R) latch RS1, a second S/R latch RS2, a top voltage divider resistor $R_5$, a bottom voltage divider resistor $R_6$, a first sampling switch 131, a second sampling switch 132, a first sampling capacitor $C_1$, a second sampling capacitor $C_2$, a first gain circuit GAIN1, and a second gain circuit GAIN2. Although one embodiment of a PWM controller 122 implemented is depicted, the teachings herein are applicable to PWM controllers implemented in a wide variety of ways. Accordingly, other implementations are possible.

As shown in FIG. 9, the top voltage divider resistor $R_5$ and the bottom voltage divider resistor $R_6$ are connected as a resistor divider that generates a voltage signal HALFVIN that is about equal to about half the input voltage $V_{IN}$. Thus, $R_5$ and $R_6$ can have nominally equal resistance values.

In the illustrated embodiment, the first sampling switch 131 and the second sampling switch 132 are connected between the middle node MID and the first sampling capacitor $C_1$ and the second sampling capacitor $C_2$, respectively.

When the power transistor $Q_2$ is turned on by the control signal C (as shown in FIGS. 2C and 2D the power transistor $Q_4$ is also turned on by A' when C is active), the first sampling switch 131 is also turned on to store the voltage of the first flying capacitor $C_{fly1}$ on the first sampling capacitor $C_1$. Additionally, the difference between the sampled voltage of the first sampling capacitor $C_1$ and the voltage signal HALFVIN is amplified by the first gain circuit GAIN1. The first half limiter 125 serves to limit the output of the first gain circuit GAIN1. In particular, when the output of the first gain circuit GAIN1 is negative, the output of the first half limiter 125 is zero. However, when the output of the first gain circuit GAIN1 is positive, the output of the first half limiter 125 tracks the input of the first half limiter 125 until reaching the maximum allowed output value. The output of the first half limiter 125 controls a first controlled voltage source 127 to adjust the threshold ITH generated by the error amplifier EA. Thus, the first controlled voltage source 127 generates a first adjusted threshold ITH1 equal to about ITH minus a first adjustment voltage set by the first half limiter 125.

Symmetrically, when the power transistor $Q_6$ is turned on by the control signal D (as shown in FIGS. 2C and 2D the power transistor $Q_8$ is also turned on by B' when D is active), the second sampling switch 132 is also turned on to store the voltage of the second flying capacitor $C_{fly2}$ on the second sampling capacitor $C_2$. Additionally, the difference between the sampled voltage of the second sampling capacitor C2 and the voltage signal HALFVIN is amplified by the second gain circuit GAIN2. The second half limiter 126 serves to limit the output of the second gain circuit GAIN2 by outputting zero when the output of the second gain circuit GAIN2 is negative and by tracking the output of the second gain circuit GAIN2 up to a maximum allowed output value when the output of the second gain circuit GAIN2 is positive. The second controlled voltage source 128 generates a second adjusted threshold ITH2 equal to about ITH minus a second adjustment voltage set by the second half limiter 126.

With continuing reference to FIG. 9, the output voltage $V_O$ is divided down to generate a feedback signal FB using a resistor divider formed by the first resistor $R_1$ and the second resistor $R_2$. The feedback signal FB couples to the inverting input of the error amplifier EA, which can be implemented as a transconductance amplifier. A reference DC voltage REF is coupled to the non-inverting input of the error amplifier EA, and the error between FB and REF is converted as a current output used to set the threshold ITH. The amplifier stability network 129 can be implemented in a wide variety of ways, such as using a resistor-capacitor (RC) compensation network for providing stability compensation.

The first comparator CMP1 compares an indication of the current of the first inductor $L_1$ (provided by the first current sensing circuit 123) to the first adjusted threshold ITH1, while the second comparator CMP2 compares an indication of the current of the second inductor $L_2$ (provided by the second current sensing circuit 124) to the second adjusted threshold ITH2.

The first SR latch RS1 outputs a first PWM control signal A that is set when the first clock signal CLK1 is applied. When the first sensed inductor current signal is higher than ITH1, the output of the first comparator CMP1 resets the first PWM control signal A, which is the control signal of the first power transistor $Q_1$ and the third power transistor $Q_3$. Furthermore, the first PWM control signal A can be logically inverted to control the fourth power transistor $Q_4$.

With continuing reference to FIG. 9, the second SR latch RS2 outputs a second PWM control signal B that is set when the second clock signal CLK2 is applied. In certain implementations, the second clock signal CLK2 has about a 180 degree phase shift with the first clock signal CLK1. When the second sensed inductor current signal is higher than ITH2, the output of the second comparator CMP2 resets the second PWM control signal B, which is the control signal of the fifth power transistor $Q_5$ and the seventh power transistor $Q_7$. Furthermore, the second PWM control signal B can be logically inverted to control the eighth power transistor $Q_8$. Moreover, digital logic operations (see for example, the configuration FIG. 2B) can be used to generate a third PWM control signal C for controlling the second power transistor $Q_2$ and a fourth PWM control signal D for controlling the sixth power transistor $Q_6$.

Figure 10A:
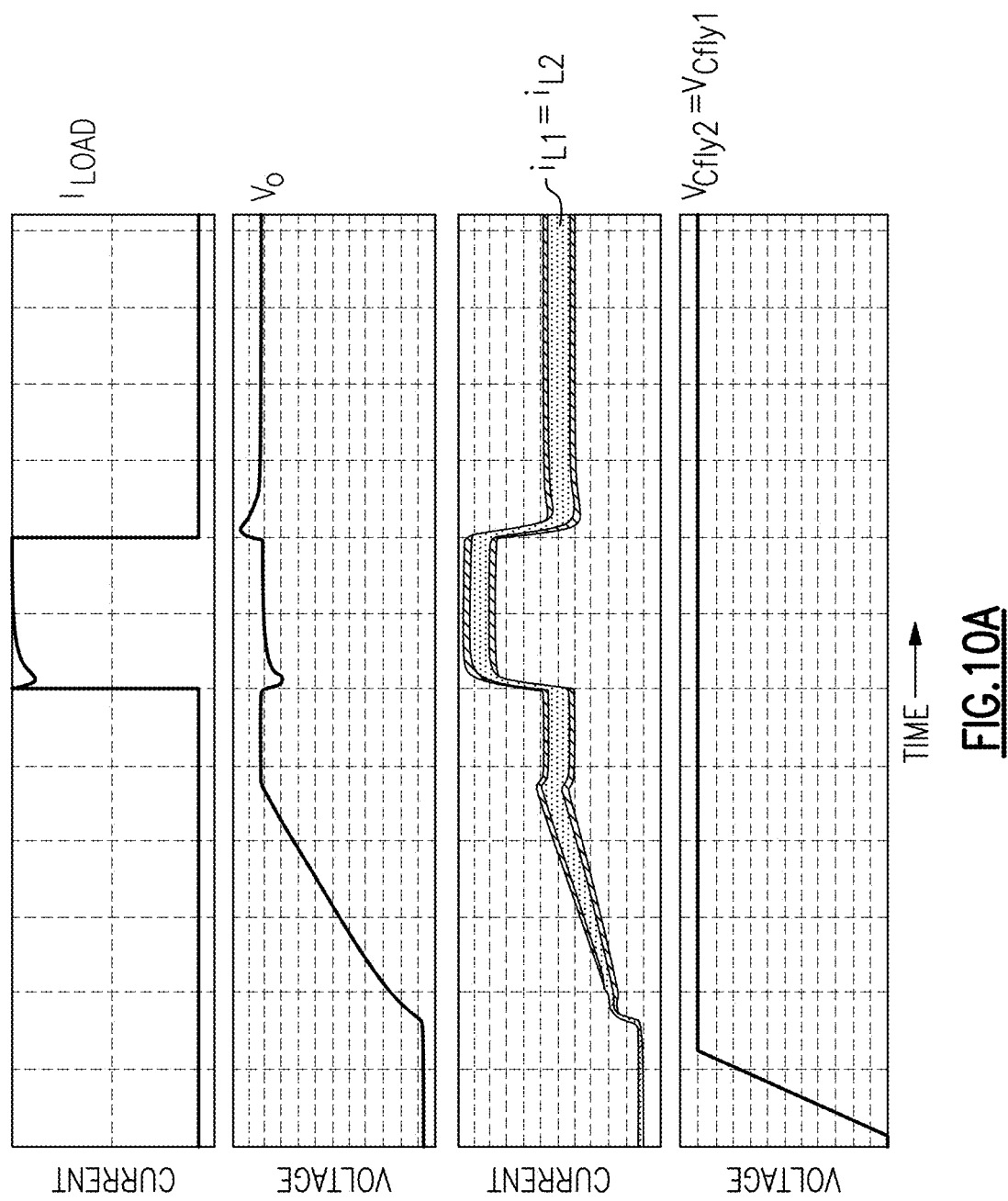
FIG. 10A is one example of a transient performance simulation with flying capacitor mismatch for the hybrid power conversion system of FIG. 9.

FIG. 10A is one example of a transient performance simulation with flying capacitor mismatch for the hybrid power conversion system 150 of FIG. 9.

The simulation results are depicted for a simulation in which $C_{FLY1} \neq C_{FLY2}$. As shown in FIG. 10A, the flying capacitor voltages are both well locked at $\frac{1}{2}V_{IN}$, and inductor currents are also closely matched, even when the dynamic load is applied to the output of the hybrid converter 121.

Figure 10B:
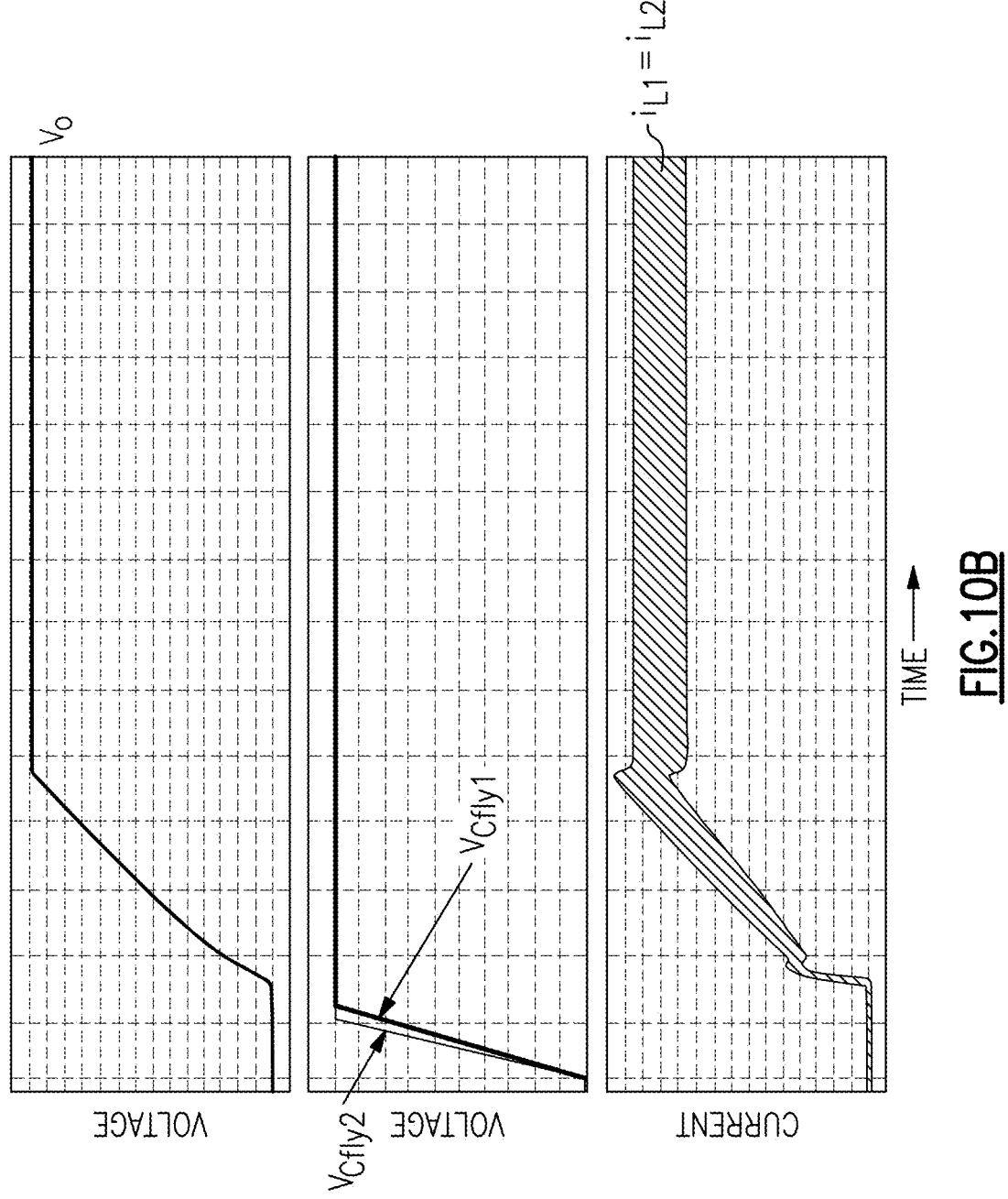
FIG. 10B is one example of a transient performance simulation with comparator mismatch for the hybrid power conversion system of FIG. 9.

FIG. 10B is one example of a transient performance simulation with comparator mismatch for the hybrid power conversion system 150 of FIG. 9.

The simulation results are depicted for a simulation in which the current comparators have mismatched input offset. As shown in the FIG. 10B, the PWM controller 122 serves to adjust ITH1 and ITH2 to ensure that $V_{cfly1} = V_{cfly2} = \frac{1}{2}V_{IN}$, and that $i_{L1} = i_{L2}$.

Figure 11:
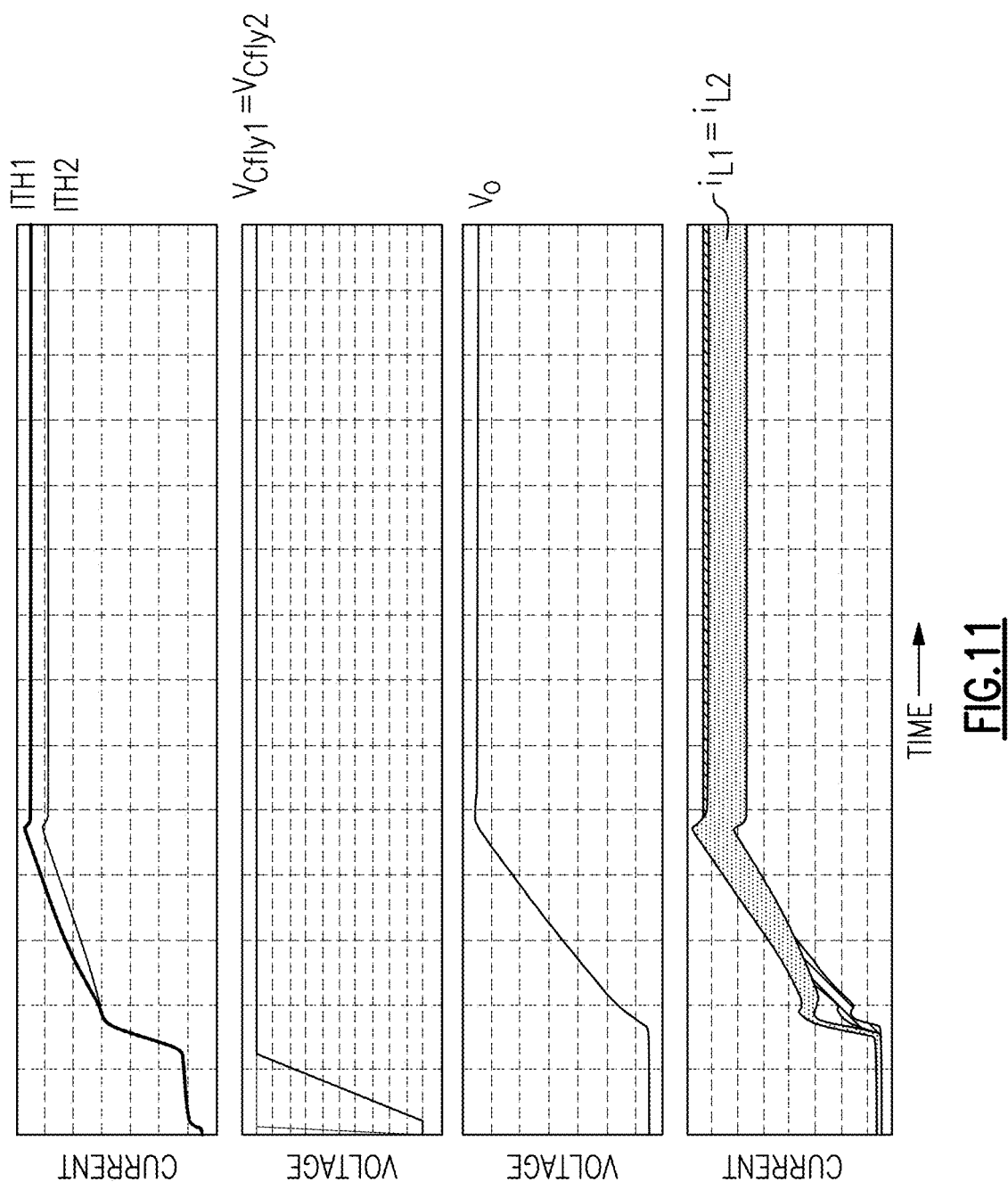
FIG. 11 is one example of a transient performance simulation with inductor mismatch for the hybrid power conversion system of FIG. 9.

FIG. 11 is one example of a transient performance simulation with inductor mismatch for the hybrid power conversion system 150 of FIG. 9.

The simulation results are depicted for a simulation in which $L_1 \neq L_2$. As shown in FIG. 11, the flying capacitor voltages are both well locked at $\frac{1}{2}V_{IN}$, and inductor currents are also closely matched, even when the dynamic load is applied.

Figure 12:
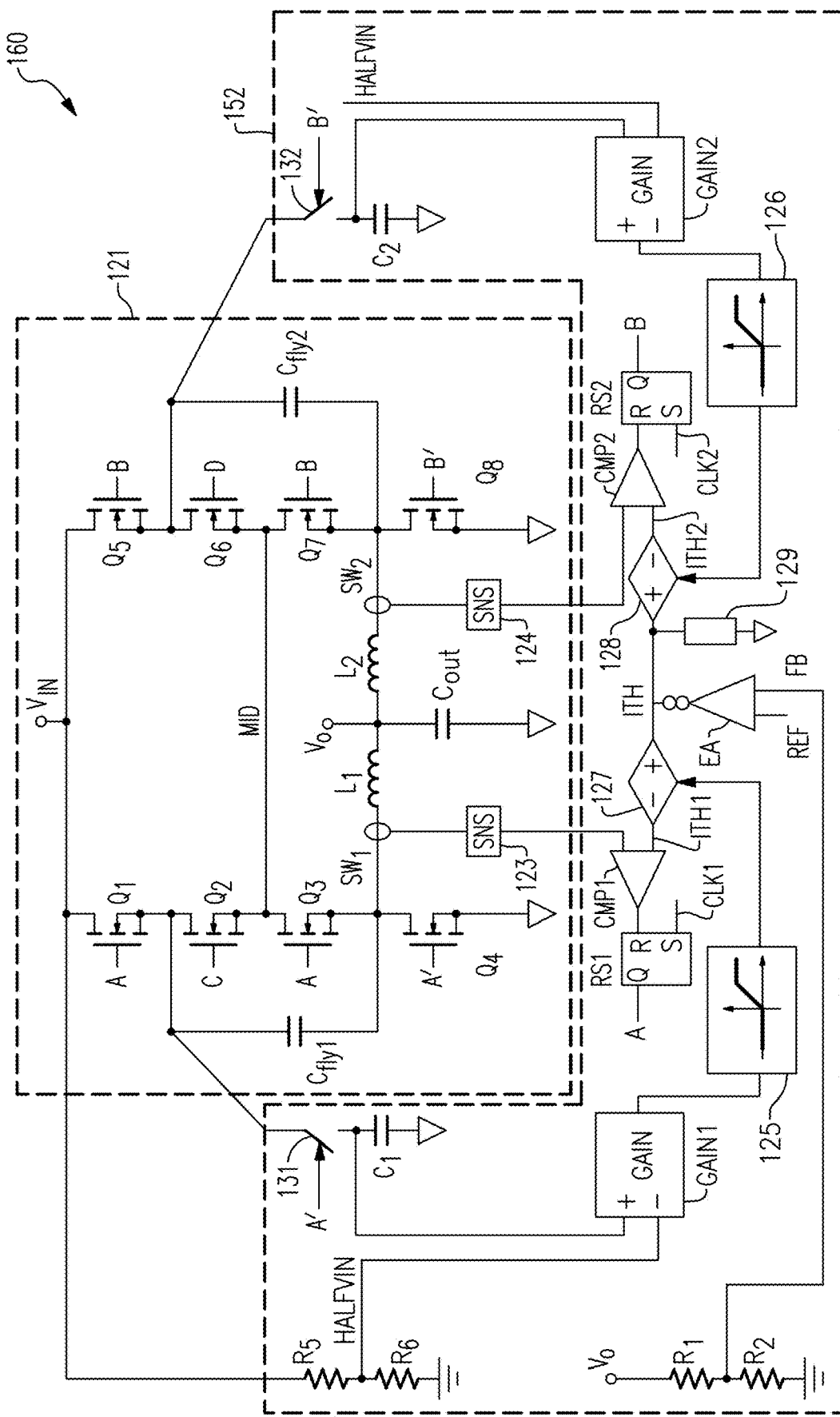
FIG. 12 is a schematic diagram of a hybrid power conversion system according to another embodiment.

FIG. 12 is a schematic diagram of a hybrid power conversion system 160 according to another embodiment. The hybrid power conversion system 160 includes a hybrid converter 121 and a PWM controller 152.

The PWM controller 152 of FIG. 12 is similar to the PWM controller 122 of FIG. 9, except that the embodiment of FIG. 12 illustrates a different implementation of the first sampling switch 131 and the second sampling switch 132. In particular, the first sampling switch 131 is directly connected between a first end of the first flying capacitor $C_{fly1}$ and the first sampling capacitor $C_1$ and controlled by control signal A', while the second sampling switch 132 is directly connected between a first end of the second flying capacitor $C_{fly2}$ and the second sampling capacitor $C_2$ and controlled by control signal B'. Implementing the PWM controller 152 of FIG. 12 in this manner provides longer sampling time (see for example, the timing diagrams of FIGS. 2C and 2D) relative to the PWM controller 122 of FIG. 9.

Figure 13:
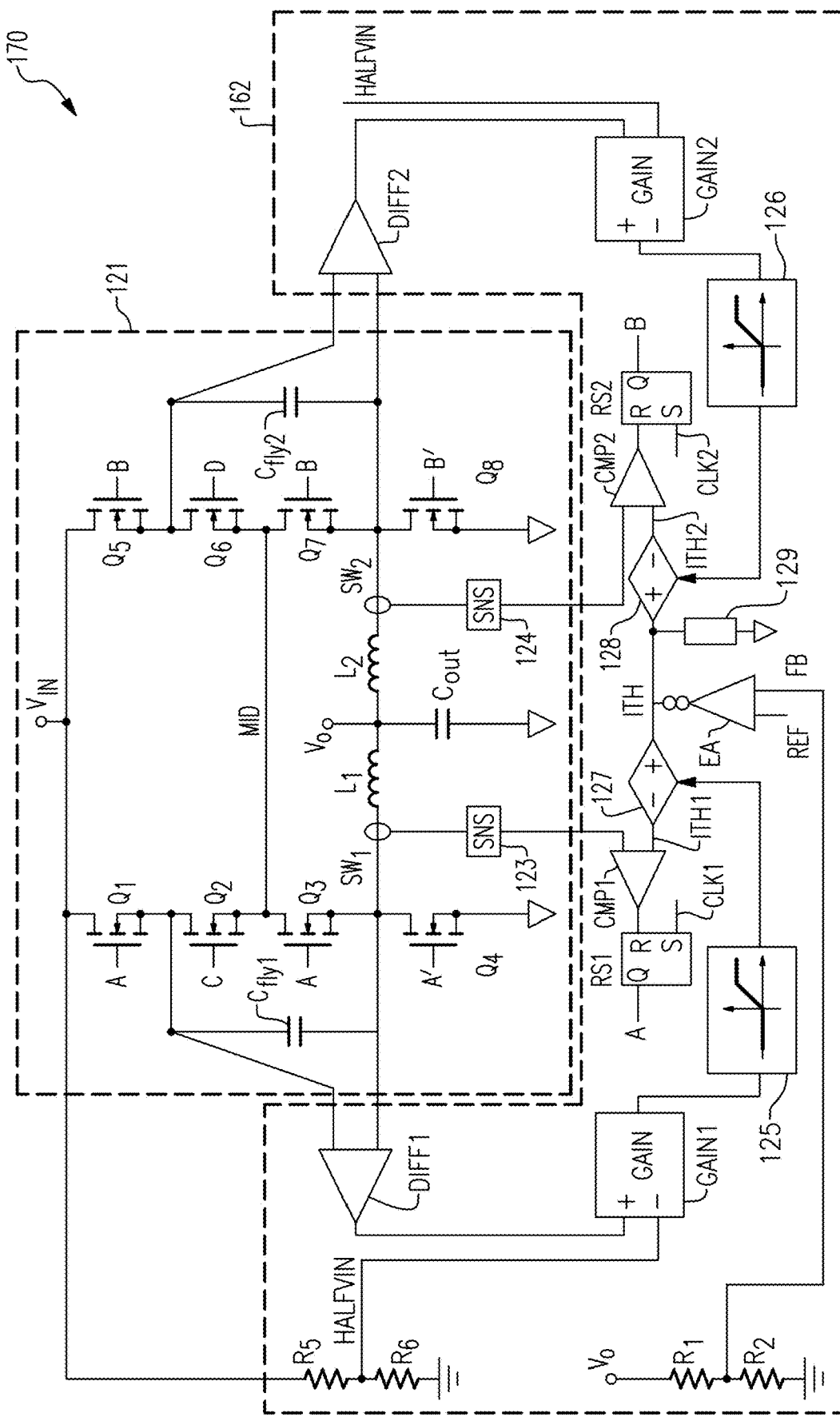
FIG. 13 is a schematic diagram of a hybrid power conversion system according to another embodiment.

FIG. 13 is a schematic diagram of a hybrid power conversion system 170 according to another embodiment. The hybrid power conversion system 170 includes a hybrid converter 121 and a PWM controller 162.

The PWM controller 162 of FIG. 13 is similar to the PWM controller 122 of FIG. 9, except that the PWM controller 162 of FIG. 13 omits the sampling switches 131 and 132 and the sampling capacitors $C_1$ and $C_2$ in favor of including a first differential amplifier DIFF1 and a second differential amplifier DIFF2. As shown in FIG. 13, the first differential amplifier DIFF1 has a differential input coupled across the first flying capacitor $C_{fly1}$ and an output coupled to a non-inverting input of the first gain circuit GAIN1. Additionally, the second differential amplifier DIFF2 has a differential input coupled across the second flying capacitor $C_{fly2}$ and an output coupled to a non-inverting input of the second gain circuit GAIN2. The first gain circuit GAIN1 and the second gain circuit GAIN2 each include an inverting input that receives HALFVIN.

By implementing the PWM controller 162 in this manner, enhanced tracking of the flying capacitor voltages is achieved at the expense of an increase in complexity. For example, the first differential amplifier DIFF1 and the second differential amplifier DIFF2 provide a continuous indication of the voltages across the first flying capacitor $C_{fly1}$ and the second flying capacitor $C_{fly2}$, respectively, but operate with a wide input voltage range.

Figure 14:
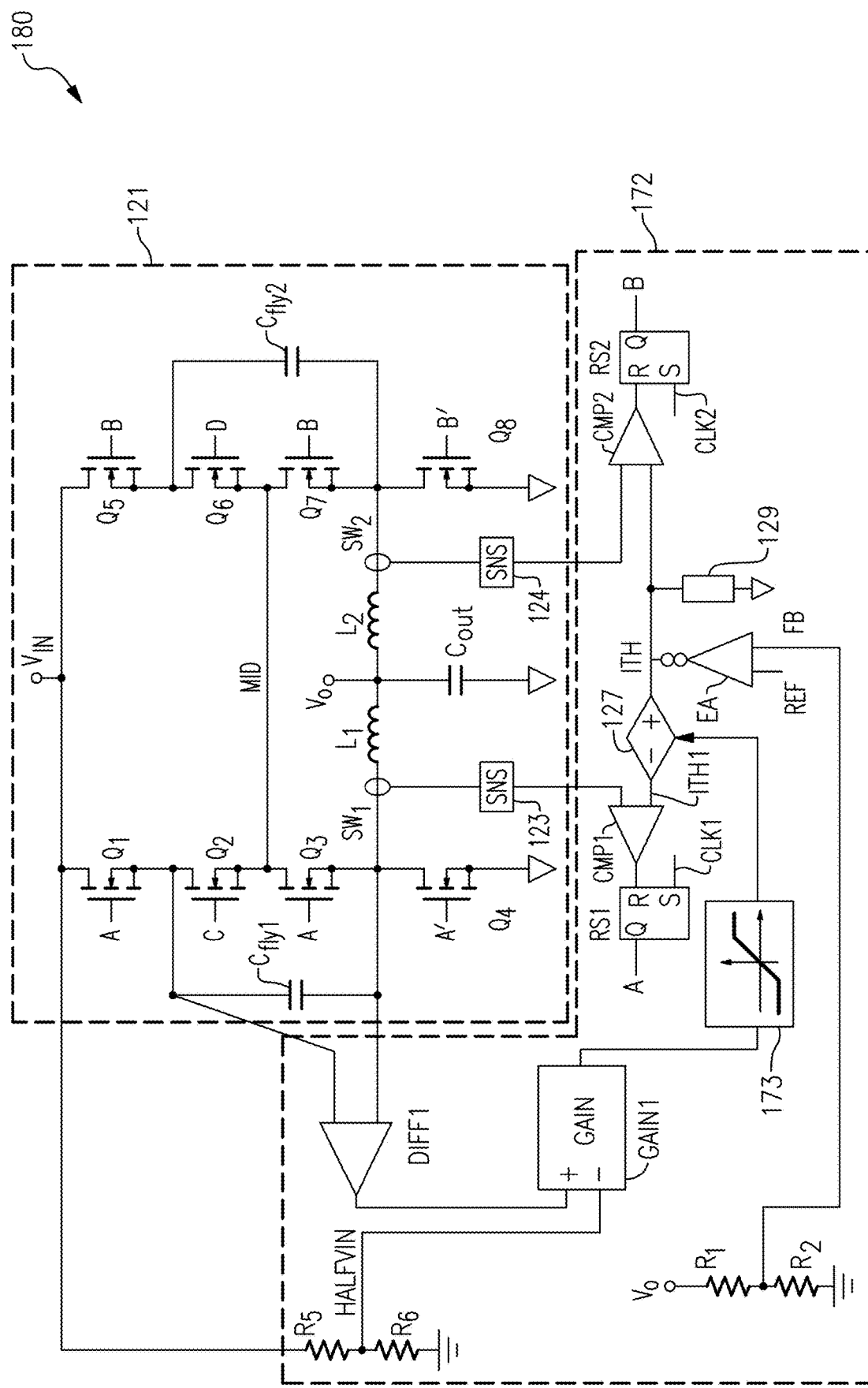
FIG. 14 is a schematic diagram of a hybrid power conversion system according to another embodiment.

FIG. 14 is a schematic diagram of a hybrid power conversion system 180 according to another embodiment. The hybrid power conversion system 180 includes a hybrid converter 121 and a PWM controller 172.

The PWM controller 172 of FIG. 14 is similar to the PWM controller 162 of FIG. 13, except that the PWM controller 172 omits the second differential amplifier DIFF2, the second gain circuit GAIN2, the second half limiter 126, and the second controlled voltage source 128. Furthermore, the PWM controller 172 omits the first half limiter 125 in favor of including a full limiter 173.

By using the full limiter 173 to control the first controlled voltage source 127, adjustment of the threshold voltage ITH1 is provided to maintain the voltage across the first flying capacitor $C_{fly1}$ about equal to $\frac{1}{2}V_{IN}$.

Figure 15:
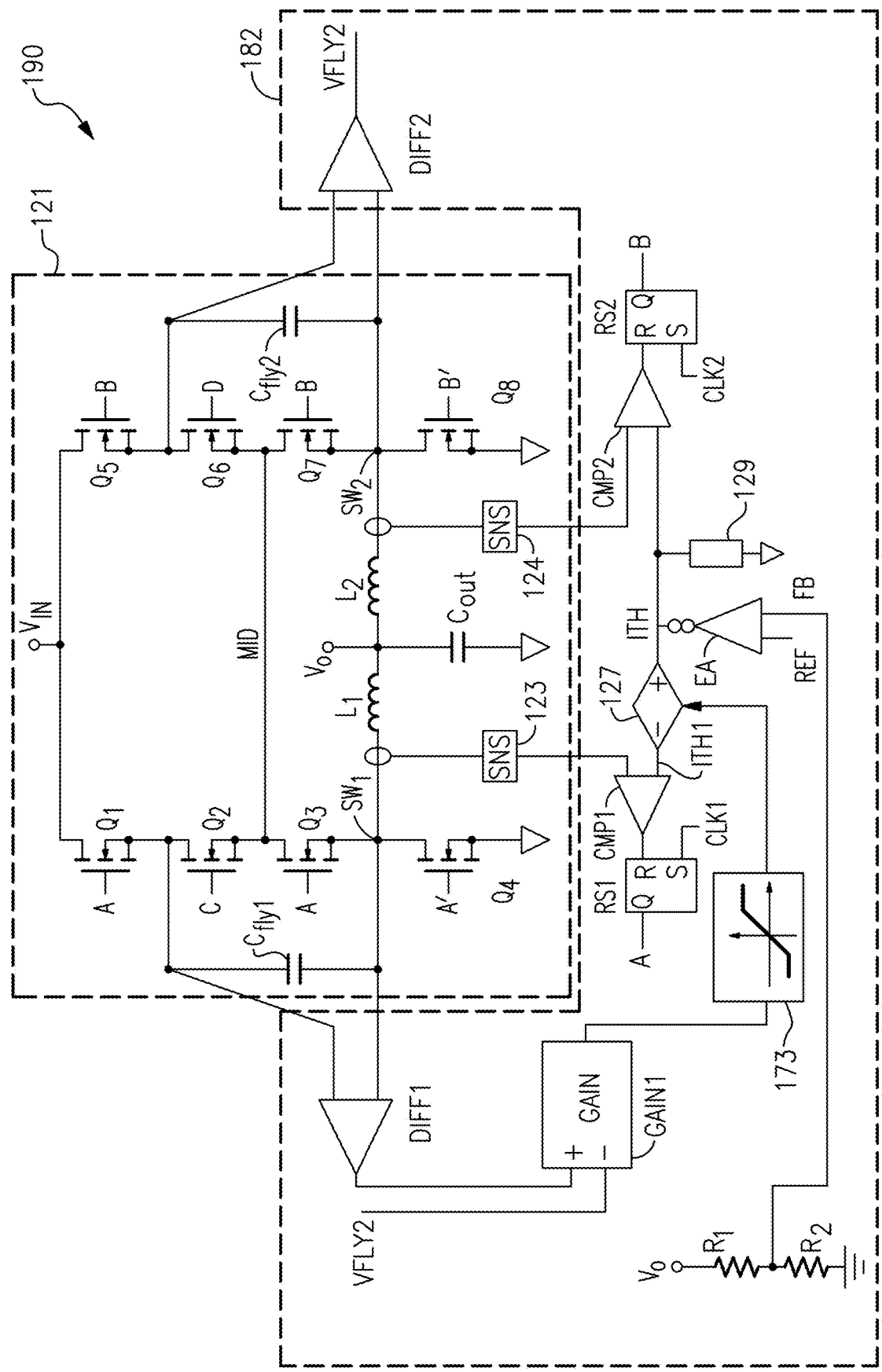
FIG. 15 is a schematic diagram of a hybrid power conversion system according to another embodiment.

FIG. 15 is a schematic diagram of a hybrid power conversion system 190 according to another embodiment. The hybrid power conversion system 190 includes a hybrid converter 121 and a PWM controller 182.

The PWM controller 182 of FIG. 15 is similar to the PWM controller 172 of FIG. 14, except that the PWM controller 182 omits resistors $R_5$ and $R_6$ in favor of including the second differential amplifier DIFF2. As shown in FIG. 15, the first gain circuit GAIN1 compares an output of the first differential amplifier DIFF1 to an output of the second differential amplifier DIFF2.

Figure 16:
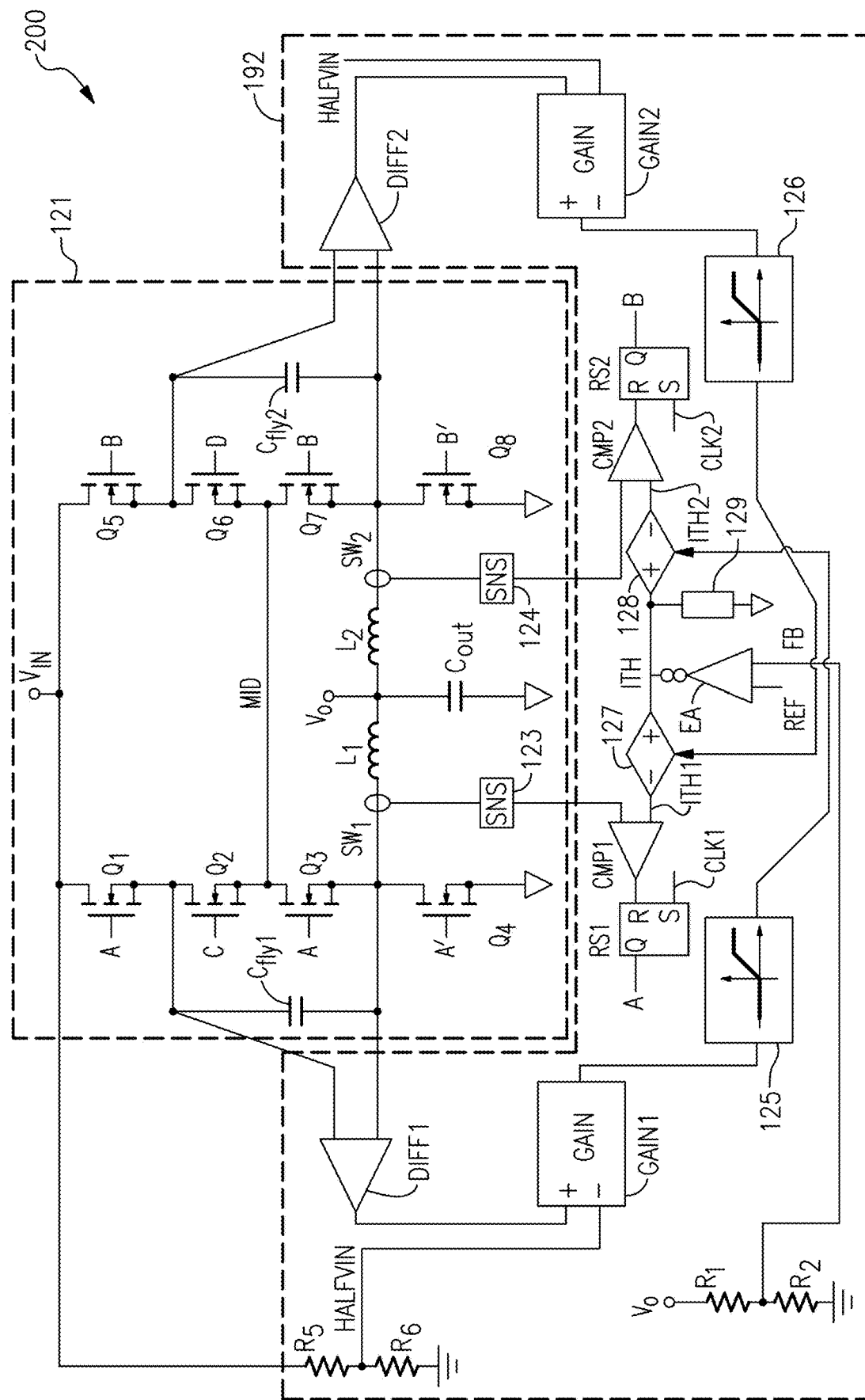
FIG. 16 is a schematic diagram of a hybrid power conversion system according to another embodiment.

FIG. 16 is a schematic diagram of a hybrid power conversion system 200 according to another embodiment. The hybrid power conversion system 200 includes a hybrid converter 121 and a PWM controller 192.

The PWM controller 192 of FIG. 16 is similar to the PWM controller 162 of FIG. 13, except that the PWM controller 192 is implemented such that the first half limiter 125 controls the second controlled voltage source 128 and the second half limiter 126 controls the first controlled voltage source 127.

Figure 17:
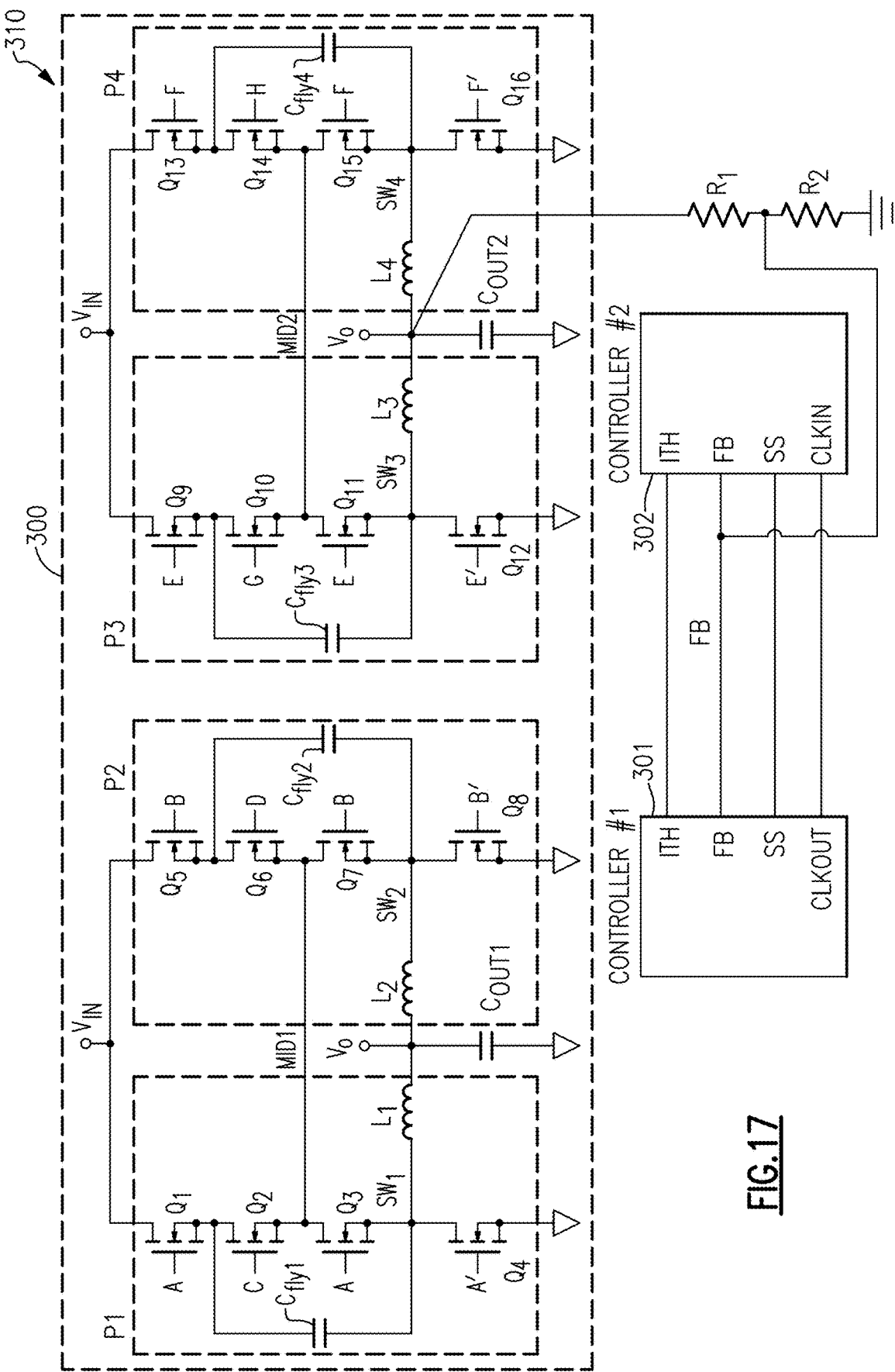
FIG. 17 is a schematic diagram of a hybrid power conversion system according to another embodiment.

FIG. 17 is a schematic diagram of a hybrid power conversion system 310 according to another embodiment. The hybrid power conversion system 310 includes a hybrid converter 300, a first PWM controller 301, a second PWM controller 302, a first resistor $R_1$, and a second resistor $R_2$. The PWM controllers of FIG. 17 can be implemented in accordance with any of the embodiments herein.

In the illustrated embodiment, the hybrid converter 300 includes a first half power stage P1 and a second half power stage P2, which are implemented in a manner similar to that of the hybrid converter 111 of FIG. 2A. The first half power stage P1 and the second half power stage P2 form a first power stage. Nodes $SW_1$, $SW_2$, and MID1 and a first output capacitor $C_{OUT1}$ are also present for these half stages. The first PWM controller 301 generates PWM control signals A, A', B, B', C, and D for the first half power stage P1 and the second half power stage P2. Although not shown in FIG. 17, current sensing circuits for the first inductor $L_1$ and the second inductor $L_2$ can also be included.

The hybrid converter 310 further includes a third half power stage P3 and a fourth half power stage P4. The third half power stage P3 and the fourth power stage P4 form a second power stage, and thus the hybrid converter 310 is implemented using two stages, in this embodiment.

The third half power stage P3 includes a ninth power transistor $Q_9$, a tenth power transistor $Q_{10}$, an eleventh power transistor $Q_{11}$, a twelfth power transistor $Q_{12}$, a third inductor $L_3$, and a third flying capacitor $C_{fly3}$. Additionally, the fourth half power stage P4 includes a thirteenth power transistor $Q_{13}$, a fourteenth power transistor $Q_{14}$, a fifteenth power transistor $Q_{15}$, a sixteenth power transistor $Q_{16}$, a fourth inductor $L_4$, and a fourth flying capacitor $C_{fly4}$. Nodes $SW_3$, $SW_4$, and MID2 and a second output capacitor $C_{OUT2}$ are also present for these half stages. The second PWM controller 302 generates PWM control signals E, E', F, F', G, and H for the third half power stage P3 and the fourth half power stage P4. Although not shown in FIG. 17, current sensing circuits for the third inductor $L_3$ and the fourth inductor $L_4$ can also be included. All four half power stages P1-P4 operate with a shared $V_{IN}$ and a shared $V_O$, in this embodiment.

The teachings herein are applicable to hybrid converters including not only two power stages (for instance, two power stages in the embodiment of FIG. 17), but also other number of power stages.

The first PWM controller 301 and the second PWM controller 302 operate with a common ITH (prior to adjustment by threshold adjustment circuits), a shared soft start (SS) signal, and a shared feedback signal FB generated by the output voltage divider formed by resistors $R_1$ and $R_2$. The first PWM controller 301 also provides a clock signal from an output CLKOUT to an input CLKIN of the second PWM controller 302 to aid in coordinating timing of PWM signals and to match regulator switching frequency. The SS signal can be used to provide soft-start. For instance, a current source can be included in each PWM controller, and can connect to an off-chip capacitor to allow the SS signal voltage to ramp up smoothly. Furthermore, a voltage regulation loop regulates the feedback FB to SS or an internal reference REF, whichever is lower, so that output voltage ramps up linearly. Although one example of soft-start is described, other implementations are possible. Any of the embodiments herein can operate with soft start.

Figure 18:
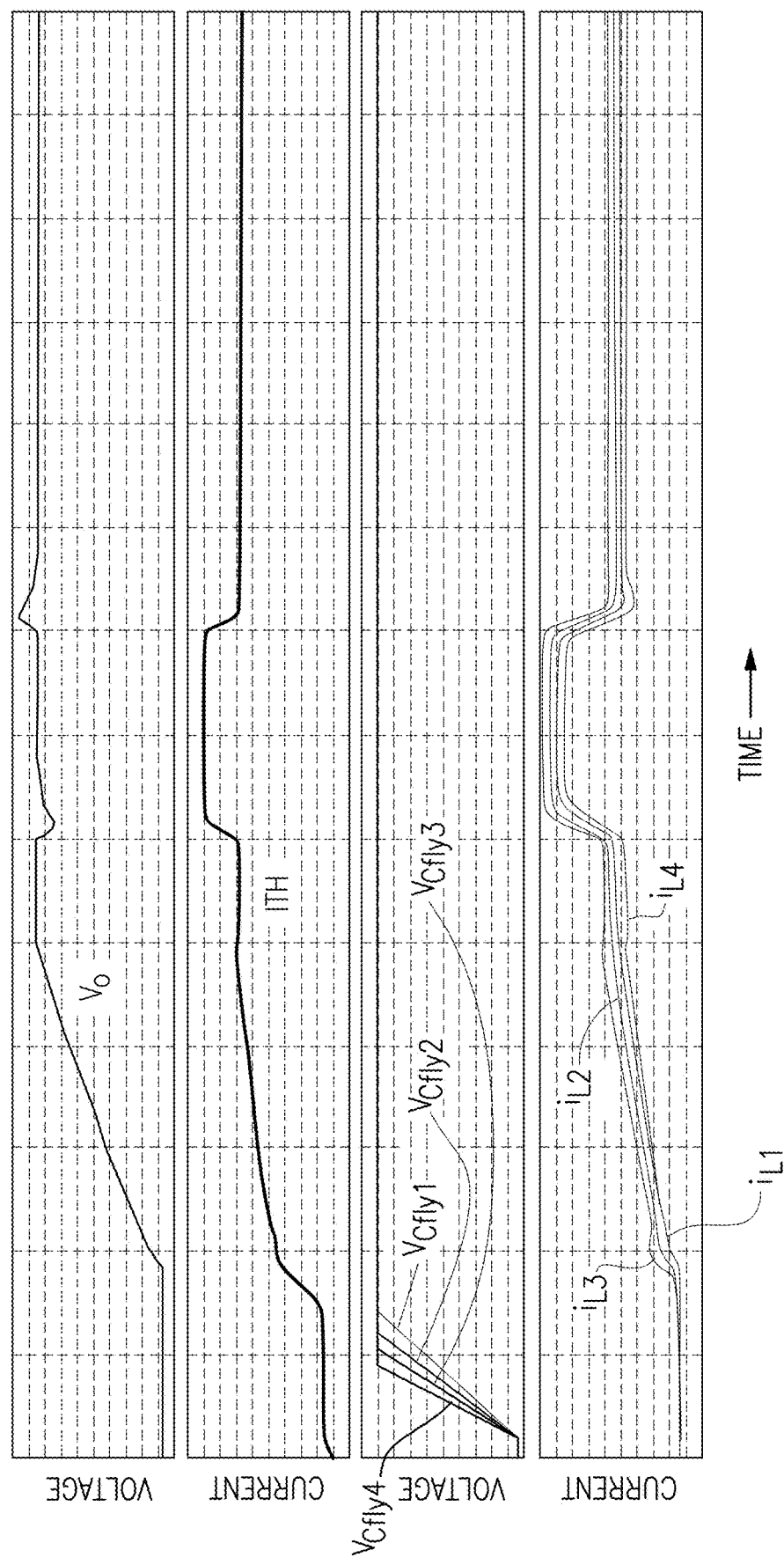
FIG. 18 is one example of a transient performance simulation with inductor mismatch, flying capacitor mismatch, comparator mismatch, and current sensing gain mismatch for the hybrid power conversion system of FIG. 17.

FIG. 18 is one example of a transient performance simulation with inductor mismatch, flying capacitor mismatch, comparator mismatch, and current sensing gain mismatch for the hybrid power conversion system 310 of FIG. 17.

As shown in FIG. 18, the hybrid power conversion system 310 provides stable regulation in the presence of a load current step.

Figure 19A:
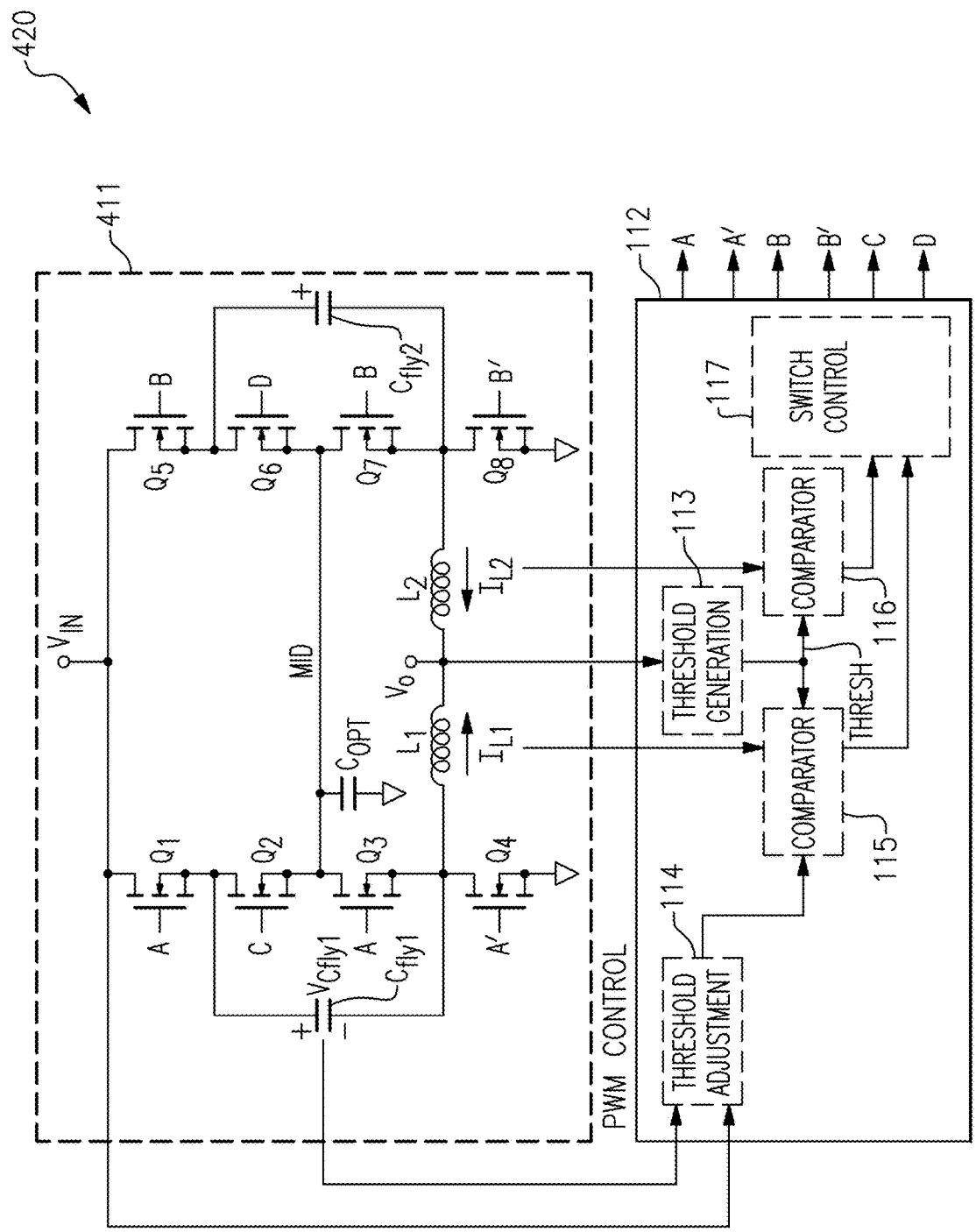
FIG. 19A is a schematic diagram of a hybrid power conversion system according to another embodiment.

FIG. 19A is a schematic diagram of a hybrid power conversion system 420 according to another embodiment. The hybrid power conversion system 420 includes a hybrid converter 411 and a PWM controller 112.

The hybrid power conversion system 420 of FIG. 19A is similar to the hybrid power conversion system 420 of FIG. 8, except that the hybrid power conversion system 420 illustrates a different implementation of a hybrid converter. In particular, in comparison to the hybrid converter 111 shown in FIG. 8, the hybrid converter 411 of FIG. 19A further includes a capacitor $C_{OPT}$ connected between the middle node MID and ground.

The PWM control schemes herein are applicable to hybrid converters implemented in a wide variety of ways.

Figure 19B:
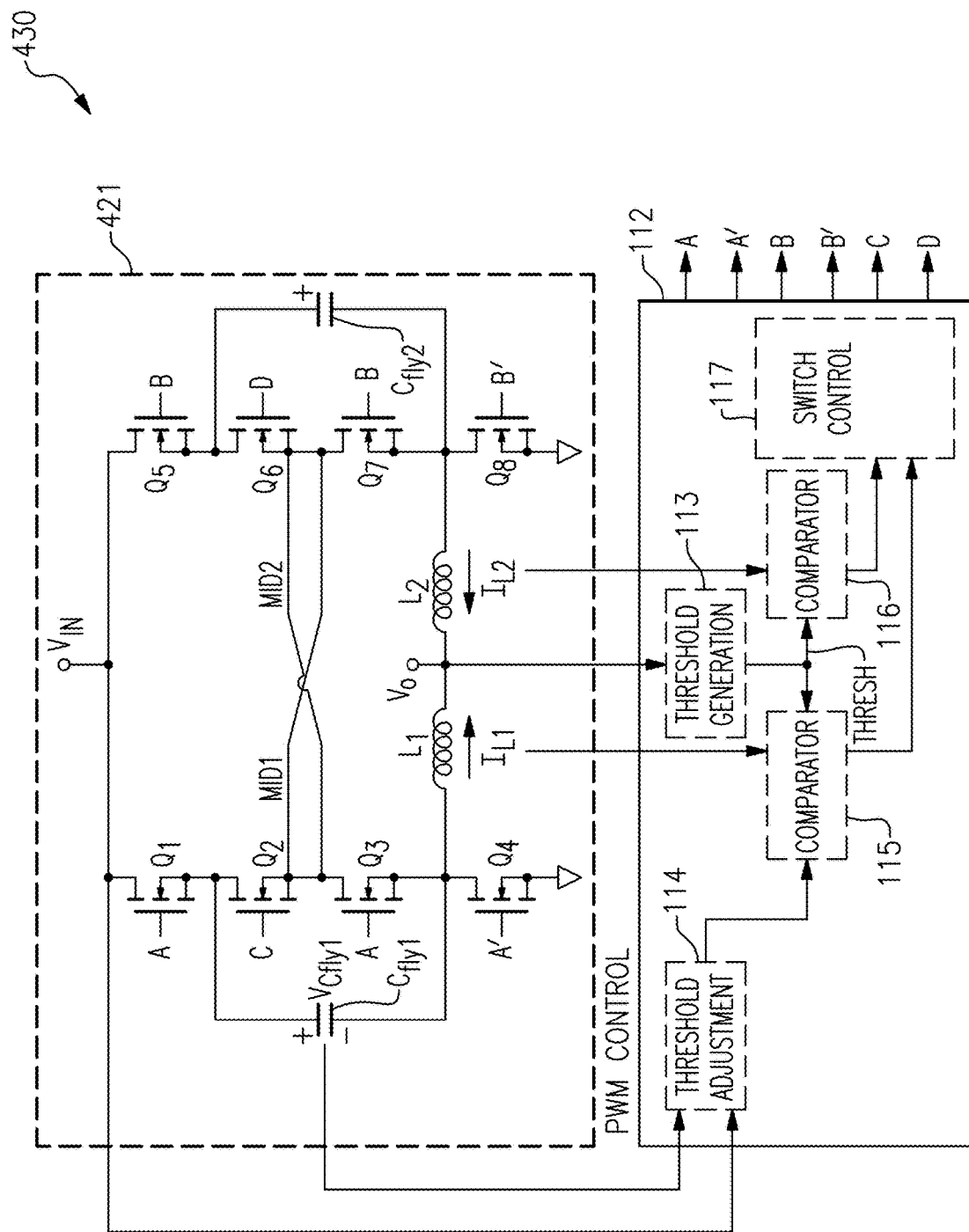
FIG. 19B is a schematic diagram of a hybrid power conversion system according to another embodiment.

FIG. 19B is a schematic diagram of a hybrid power conversion system 430 according to another embodiment. The hybrid power conversion system 430 includes a hybrid converter 421 and a PWM controller 112.

In comparison to the hybrid converter 111 of FIG. 8, the hybrid converter 421 of FIG. 19B includes a first conductor MID1 connecting the source of power transistor Q2 and the drain of power transistor Q7, and a second conductor MID2 connecting the source of power transistor Q6 and the drain of power transistor Q3. Implementing the hybrid converter 421 in this manner enhances converter balancing between half stages.

Figure 19C:
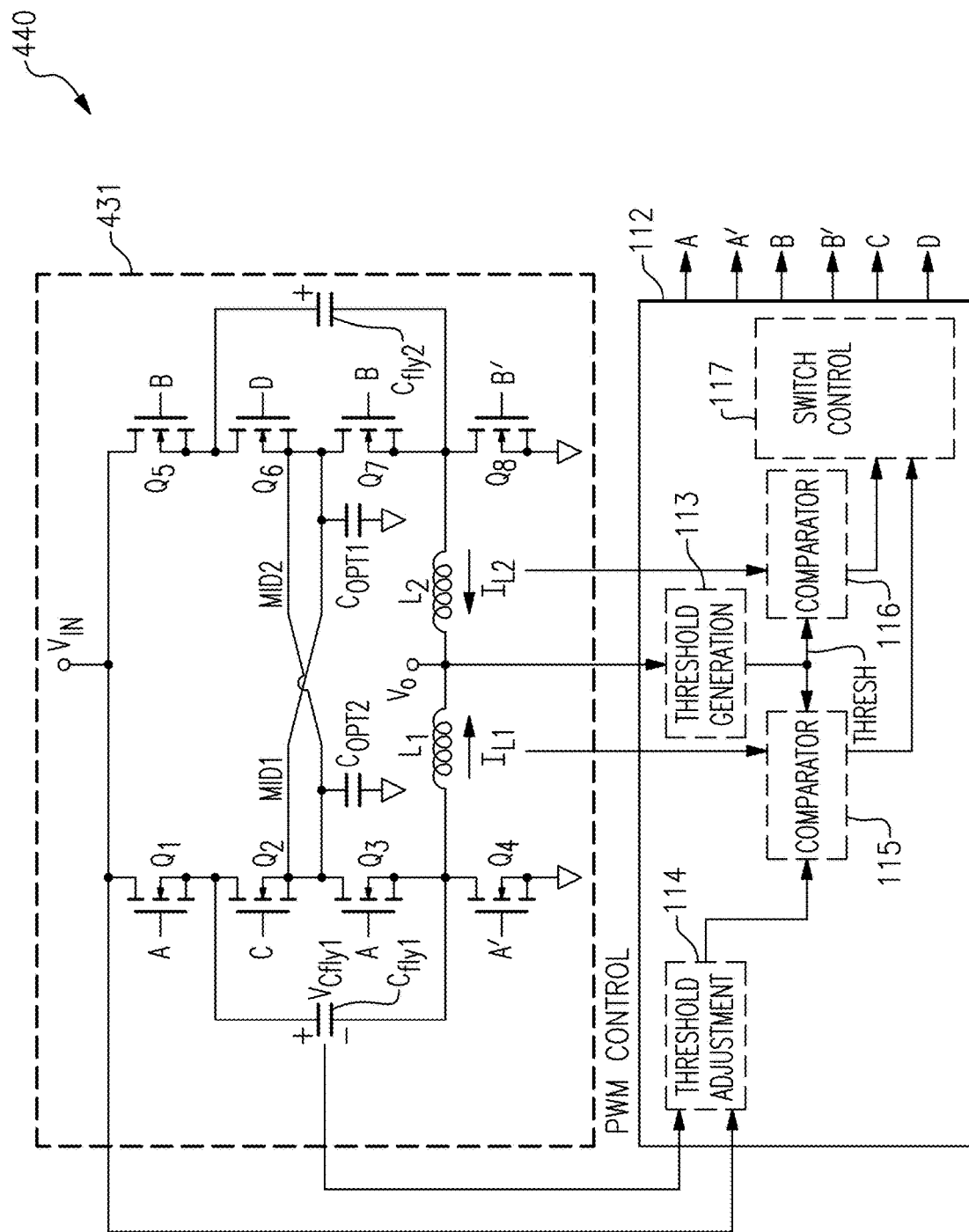
FIG. 19C is a schematic diagram of a hybrid power conversion system according to another embodiment.

FIG. 19C is a schematic diagram of a hybrid power conversion system 440 according to another embodiment. The hybrid power conversion system 440 includes a hybrid converter 431 and a PWM controller 112.

In comparison to the hybrid converter 421 of FIG. 19B, the hybrid converter 431 of FIG. 19C includes a first capacitor $C_{OPT1}$ connected between MID1 and ground, and a second capacitor $C_{OPT2}$ connected between MID2 and ground.

Applications

Devices employing the above described schemes can be implemented into various electronic devices in a wide range of applications including, but not limited to, bus converters, high current distributed power systems, telecom systems, datacom systems, storage systems, and automotive systems. Thus, examples of electronic devices that can be implemented with the hybrid power conversion systems herein include, but are not limited to, communication systems, consumer electronic products, electronic test equipment, communication infrastructure, servers, automobiles, etc.

Conclusion

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A power conversion system comprising:
a power converter configured to generate a regulated output voltage based on an input voltage, wherein the power converter comprises:
a first inductor, a first capacitor, and a first group of switches configured to control electrical connectivity of the first inductor and the first capacitor, wherein the first inductor, the first capacitor, and the first group of switches are arranged as a first half power stage; and
a second inductor, a second capacitor, and a second group of switches, wherein the second inductor, the second capacitor, and the second group of switches are arranged as a second half power stage; and
a pulse width modulation (PWM) controller comprising a threshold generation circuit configured to generate a threshold signal based on the regulated output voltage, a first threshold adjustment circuit configured to generate a first adjusted threshold signal by adjusting the threshold signal based on the input voltage and a voltage of the first capacitor, a first comparator configured to compare a current through the first inductor to the first adjusted threshold signal, and a switch control circuit configured to generate at least one control signal for controlling the first group of switches based on an output of the first comparator,
wherein the first threshold adjustment circuit is operable to compensate for mismatch between the first half power stage and the second half power stage.

2. The power conversion system of claim 1, wherein the PWM controller further comprises a second comparator and the switch control circuit is further configured to control the second group of switches based on an output of the second comparator.

3. The power conversion system of claim 2, wherein the first threshold adjustment circuit is operable to compensate for mismatch between the first comparator and the second comparator.

4. The power conversion system of claim 2, further comprising a second threshold adjustment circuit configured to generate a second adjusted threshold signal by adjusting the threshold signal based on the input voltage and a voltage of the second capacitor, wherein the second comparator is configured to compare a current through the second inductor to the second adjusted threshold signal.

5. The power conversion system of claim 4, wherein the first threshold adjustment circuit includes a first gain circuit configured to amplify a difference between the voltage of the first capacitor and a fraction of the input voltage, and the second threshold adjustment circuit includes a second gain circuit configured to amplify a difference between the voltage of the second capacitor to the fraction of the input voltage.

6. The power conversion system of claim 5, wherein the fraction of the input voltage corresponds to one half of the input voltage.

7. The power conversion system of claim 1, wherein the first threshold adjustment circuit includes a first gain circuit configured to amplify a difference between the voltage of the first capacitor and a fraction of the input voltage, and a first limiter configured to adjust the threshold signal based on an output of the first gain circuit.

8. The power conversion system of claim 7, wherein the first threshold adjustment circuit further includes a first sampling capacitor and a first sampling switch configured to provide the voltage of the first capacitor to the sampling capacitor during a sampling phase.

9. The power conversion system of claim 7, wherein the first threshold adjustment circuit further includes a first differential amplifier including a differential input coupled across the first capacitor and an output coupled to a first input of the first gain circuit.

10. The power conversion system of claim 9, wherein the first threshold adjustment circuit further includes a voltage divider connected between the input voltage and a ground voltage and configured to provide a divided input voltage to a second input of the first gain circuit.

11. The power conversion system of claim 1, wherein the threshold generation circuit includes a voltage divider configured to generate a feedback voltage based on the regulated output voltage, and a transconductance amplifier configured to generate the threshold signal based on a difference between the feedback voltage and a reference voltage.

12. The power conversion system of claim 1, wherein the first group of switches includes a first power transistor, a second power transistor, a third power transistor, and a fourth power transistor, wherein the first power transistor, the second power transistor and the third power transistor are connected in series between the input voltage and a switch node, the fourth power transistor is connected between the switch node and a ground voltage, the first capacitor is connected between a source of the first power transistor and the switch node, and the first inductor is connected between the switch node and the regulated output voltage.

13. A method of power conversion comprising:
generating a regulated output voltage based on an input voltage using a power converter that includes a first inductor, a first capacitor, and a first group of switches for controlling electrical connectivity of the first inductor and the first capacitor;
generating a threshold signal based on the regulated output voltage using a threshold generation circuit;
generating a first adjusted threshold signal by adjusting the threshold signal based on the input voltage and a voltage of the first capacitor using a first threshold adjustment circuit;
generating a second adjusted threshold signal based on the input voltage and a voltage of a second capacitor of the power converter;
comparing a current through the first inductor to the first adjusted threshold signal using a first comparator;
comparing a current through a second inductor of the power converter to the second adjusted threshold signal using a second comparator;
controlling the first group of switches based on an output of the first comparator; and
controlling a second group of switches of the power converter based on an output of the second comparator.

14. The method of claim 13, wherein generating the first adjusted threshold signal includes amplifying a difference between the voltage of the first capacitor and a fraction of the input voltage, and limiting the amplified difference using a limiter.

15. A pulse width modulation (PWM) controller comprising:
a threshold generation circuit configured to generate a threshold signal based on a regulated output voltage of a power converter;
a first threshold adjustment circuit configured to generate a first adjusted threshold signal by adjusting the threshold signal based on an input voltage of the power converter and a first capacitor voltage of the power converter;
a second threshold adjustment circuit configured to generate a second adjusted threshold signal by adjusting the threshold signal based on the input voltage and a second capacitor voltage of the power converter;
a first comparator configured to compare a first inductor current of the power converter to the first adjusted threshold signal;
a second comparator configured to compare a second inductor current of the power converter to the second adjusted threshold signal; and
a switch control circuit configured to:
generate at least one switch control signal for the power converter based on an output of the first comparator; and
generate the at least one switch control signal based on an output of the second comparator.

16. The PWM controller of claim 15, wherein the first threshold adjustment circuit includes a first gain circuit configured to amplify a difference between the voltage of the first capacitor and a fraction of the input voltage, and the second threshold adjustment circuit includes a second gain circuit configured to amplify a difference between the second capacitor voltage and the fraction of the input voltage.

17. The PWM controller of claim 15, wherein the first threshold adjustment circuit includes a first gain circuit configured to amplify a difference between the first capacitor voltage and a fraction of the input voltage, and a first limiter configured to adjust the threshold signal based on an output of the first gain circuit.

18. The PWM controller of claim 15, wherein the first threshold adjustment circuit further includes a first differential amplifier including a differential input coupled across the first capacitor and an output coupled to a first input of the first gain circuit.

19. The PWM controller of claim 15, wherein the first threshold adjustment circuit further includes a voltage divider connected between the input voltage and a ground voltage and configured to provide a divided input voltage to a second input of the first gain circuit.

20. The PWM controller of claim 15, wherein the threshold generation circuit includes a voltage divider configured to generate a feedback voltage based on the regulated output voltage, and a transconductance amplifier configured to generate the threshold signal based on a difference between the feedback voltage and a reference voltage.

* * * * *